US012783413B2

(12) United States Patent
Amer et al.

(10) Patent No.: US 12,783,413 B2
(45) Date of Patent: Nov. 3, 2026

(54) MEMORY MODULE INCLUDING A NON-VOLATILE WRITE CACHE AND METHOD FOR OPERATING THE MEMORY MODULE

(71) Applicant: Ferroelectric Memory GmbH, Dresden (DE)

(72) Inventors: Maher Amer, Nepean (CA); Torsten Coym, Dresden (DE)

(73) Assignee: Ferroelectric GmbH, Charlotte-Bühler-Str. (DE)

( * ) Notice: Subject to any disclaimer, the term of this patent is extended or adjusted under 35 U.S.C. 154(b) by 0 days.

(21) Appl. No.: 19/004,568

(22) Filed: Dec. 30, 2024

(65) Prior Publication Data

US 2026/0186966 A1 Jul. 2, 2026

(51) Int. Cl.
*G06F 12/0802* (2016.01)
*G06F 12/02* (2006.01)

(52) U.S. Cl.
CPC ...... *G06F 12/0802* (2013.01); *G06F 12/0246* (2013.01)

(58) Field of Classification Search
CPC .......................... G06F 12/0246; G06F 12/0802
See application file for complete search history.

(56) References Cited

U.S. PATENT DOCUMENTS 6,263,398 B1 * 7/2001 Taylor ................. G06F 12/0893 711/3
2001/0011323 A1 * 8/2001 Ohta ..................... G06F 3/0613 711/158
2010/0325351 A1 * 12/2010 Bennett ............... G06F 12/0246 711/170
2012/0144109 A1 * 6/2012 Balakrishnan ...... G06F 12/0871 711/E12.019
2021/0034235 A1 * 2/2021 Kucherov ............... G06F 13/20
2024/0111434 A1 * 4/2024 Chodem ................ G11C 5/148

OTHER PUBLICATIONS

Block, Benjamin, "An Introduction to the Linux Kernel Block I/O Stack Based on Linux 5.11", IBM Deutschland Research & Development GmbH, 2021, 42 pages.
Lonzer, et al., "IBM FlashCore Module (FCM) Product Guide Features the newly available FCM4 with AI-powered ransomware detection", IBM Redbooks, IBM.com/redbooks, 2024, 34 pages.
Rollins, Doug, "An Overview of SSD Write Caching", Micron Technology, Inc., 2012, 5 pages.

(Continued)

*Primary Examiner* — Larry T Mackall
(74) *Attorney, Agent, or Firm* — Natalie Albrecht

(57) ABSTRACT

Various aspects relate to a memory module including: a non-volatile write cache; a non-volatile flash storage including a plurality of blocks, wherein each of the plurality of blocks includes a plurality of pages for storing page data; and a memory controller configured to: receive page data via a memory interface and store the page data in the non-volatile write cache, the page data being associated with a corresponding page of the plurality of pages of a block of the plurality of blocks, and indicate the corresponding page as invalid prior to writing the page data into the non-volatile flash storage.

15 Claims, 11 Drawing Sheets

(56) References Cited

OTHER PUBLICATIONS

Tavakkol, Arash, "MQSim: A Framework for Enabling Realistic Studies of Modern Multi-Queue SSD Devices", 16th USENIX Conference on File and Storage Technologies, Oakland, CA, USA; https://www.usenix.org/system/files/conference/fast18/fast18-tavakkol.pdf, 2018, 18 pages.

Umer, Muhammad, "Illustrating the Layout of Physical Media", Architecture and Design of Linux Storage Stack: gain a deep understanding of the linux storage landscape and its well-coordinated layers, (8), Packt Publishing, 2023, 18 pages.

* cited by examiner

MEMORY MODULE INCLUDING A NON-VOLATILE WRITE CACHE AND METHOD FOR OPERATING THE MEMORY MODULE

TECHNICAL FIELD

Various aspects relate to a memory module including a non-volatile write cache and to methods for operating the memory module.

BACKGROUND

In general, various computer memory technologies have been developed in semiconductor industry. Various memory modules, such as solid-state discs (SSD), include a non-volatile flash storage for persistently storing data and a volatile dynamic random-access memory (DRAM) that provides a write cache (which may also be referred to as a write buffer) for volatilely storing data that are to be written into the non-volatile flash storage for persistent storage. Using the DRAM write cache increases the speed of writing data to and/or reading data from the non-volatile flash storage, thereby mitigating the limitations of the non-volatile flash storage.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

Figure 1:
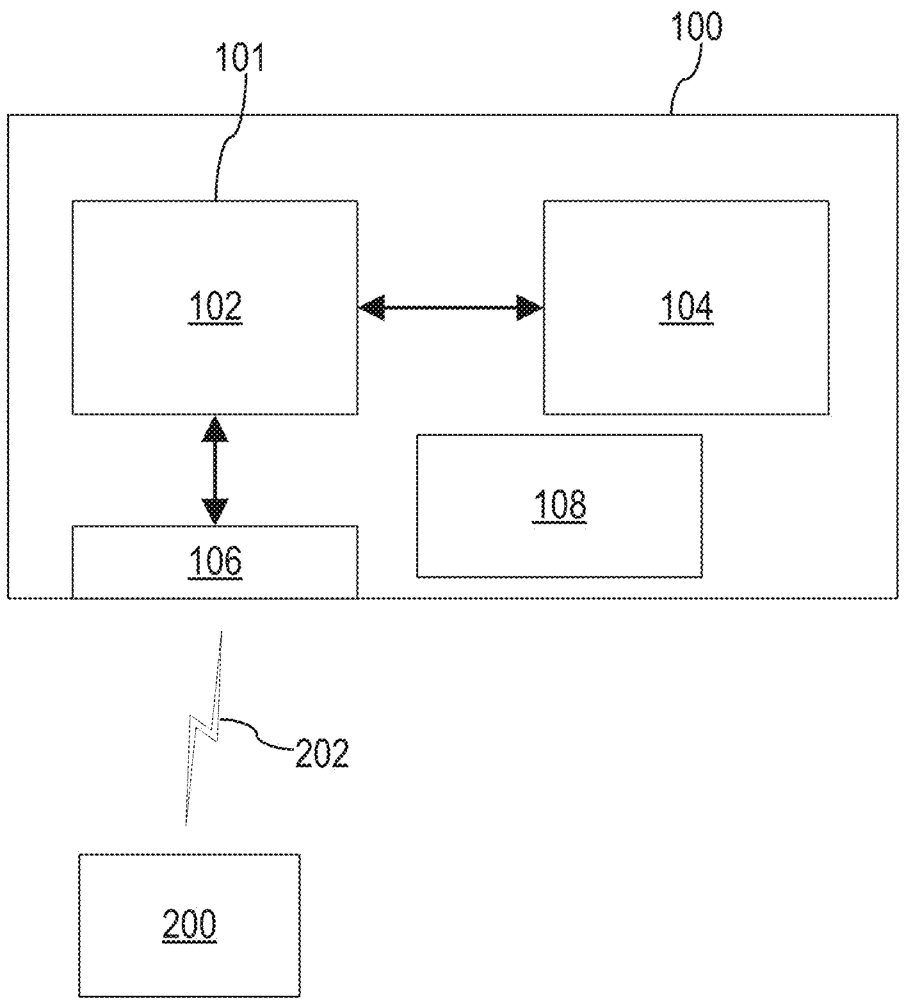
FIG. 1 shows an exemplary memory module according to various aspects.

The following detailed description refers to the accompanying drawings that show, by way of illustration, specific details and aspects in which the invention may be practiced. These aspects are described in sufficient detail to enable those skilled in the art to practice the invention. Other aspects may be utilized and structural, logical, and electrical changes may be made without departing from the scope of the invention. The various aspects are not necessarily mutually exclusive, as some aspects may be combined with one or more other aspects to form new aspects. Various aspects are described in connection with methods and various aspects are described in connection with devices (e.g., a memory cell, or a memory capacitor). However, it may be understood that aspects described in connection with methods may similarly apply to the devices, and vice versa.

Conventionally, a non-volatile flash storage of a memory module, such as solid-state discs (SSD), is coupled to a volatile dynamic random-access memory (DRAM) that provides a write and read cache (which may also be referred to as write and read buffer) for volatile storage of data that are to be written into and/or read from the non-volatile flash storage, thereby increasing the speed of writing data to and/or reading data from the non-volatile flash storage for persistent data storage.

Although the DRAM improves in particular the write speed, its volatility imposes various requirements on the operation of the memory module.

The inventors have found that using a non-volatile memory as write cache allows significant improvement on writing page data to the memory module as well as on the garbage collection process. Using the non-volatile memory as write cache allows to detach dirty cached page data in the write cache from the page data stored in the non-volatile NAND flash storage, thereby significantly reducing write amplification. Further, using the non-volatile memory as write cache allows to delay writing page data from the write cache to the NAND flash storage, thereby providing more flexibility on the timing of the writing process and the order of writing data. Further, using the non-volatile memory as write cache allows to reduce conflicts between writing received page data and writing page data as part of garbage collection. Further, using the non-volatile memory as write cache allows to reduce the time of generating new erased blocks (during garbage collection) significantly. In the following, these and further effects are described in further detail.

Various aspects relate to a memory module including: a non-volatile write cache; a non-volatile flash storage including a plurality of blocks, wherein each of the plurality of blocks includes a plurality of pages for storing page data; and a memory controller configured to: receive page data via a memory interface and store the page data in the non-volatile write cache, the page data being associated with a corresponding page of the plurality of pages of a block of the plurality of blocks (of the non-volatile flash storage); and indicate the corresponding page as invalid prior to writing the page data into the non-volatile flash storage.

In the following, various aspects refer to a NAND flash storage (viz. a flash storage having memory cells in a NAND configuration). It is understood that this serves as an example for illustration and that the memory cells of the flash storage may have any other kind of configuration.

FIG. 1 shows an exemplary memory module 100 according to various aspects. The memory module 100 may include a non-volatile memory device 101 (short: non-volatile memory 101) and a non-volatile NAND flash storage device 104 (short: non-volatile NAND flash storage 104) (as an exemplary flash storage). The non-volatile memory 101 may provide a cache 102. The cache 102 may be a cache for reading from and writing to the memory module 100. Therefore, the cache 102 may be referred to as write and read cache 102. However, various aspects detailed herein refer to writing page data employing the cache 102, wherefor, in the following, the cache 102 is described as write cache 102. It is understood that this serves to illustrate various aspects with respect to data writing and that the cache 102 may also be referred to as "write and read cache 102" or simply as "cache 102".

As an example of a non-volatile memory 101, the memory cells of the non-volatile memory 101 may be remanent-polarizable memory cells. A remanent-polarizable memory cell may be writable into at least two (different) remanent polarizable memory states. For this, the memory cell may include a capacitive memory structure, such as a spontaneously polarizable capacitor, SPOC, structure. Therefore, the memory cell may also be referred to as a capacitive memory cell or a capacitor-type memory cell. The SPOC structure may include at least one capacitor. The capacitor may include a memory element disposed between at least two electrodes (e.g., two electrode layers). The SPOC structure may include the at least one capacitor and an access transistor. For example, the memory cell may be a one transistor, T, one capacitor, C, memory cell (1T1C cell). It is understood that this serves for illustration and that the memory cell may include more than one capacitor, thus being a one transistor multiple capacitors memory cell (1T×C cell). Thus, the memory state of the memory cell may be associated with a (remanent) polarization state of the SPOC structure. The (remanent) polarization state of the SPOC may determine the amount of charge stored therein. The amount of charge stored in the SPOC structure may be used to define the memory state of the memory cell. Thus, writing the memory cell may be associated with applying an electric field over the SPOC structure to thereby set (e.g., change) the (e.g., remanent) polarization state of the SPOC structure.

The memory element of the SPOC structure may include or may consist of a spontaneously polarizable material. For example, the spontaneously polarizable material may be a remanent polarizable material, such as a ferroelectric material, or a non-remanent polarizable material, such as an anti-ferroelectric material. A memory element including or consisting of a spontaneously polarizable material may be understood such that the memory element has (e.g., within the framework of the SPOC structure) spontaneously polarizable properties. Thus, the SPOC structure may provide a spontaneously polarizable capacitor (in some aspects also referred to as memory capacitor).

The spontaneously-polarizable memory element may show a hysteresis in the (voltage (drop) dependent) polarization. The spontaneously-polarizable memory element may show non-remanent spontaneous polarization (e.g., may show anti-ferroelectric properties), e.g., the spontaneously-polarizable memory element may have no or no substantial remanent polarization remaining in the case that no voltage drops over the spontaneously-polarizable memory element. In other aspects, the spontaneously-polarizable memory element may show remanent spontaneous polarization (e.g., may show ferroelectric properties), e.g., the spontaneously-polarizable memory element may have a remanent polarization or a substantial remanent polarization remaining in the case that no voltage drops over the spontaneously-polarizable memory element.

The terms "spontaneously polarized" or "spontaneous polarization" may be used herein, for example, with reference to the polarization capability of a material beyond dielectric polarization. A "spontaneously-polarizable" (or "spontaneous-polarizable") material may be or may include a spontaneously-polarizable material that shows a remanence, e.g., a ferroelectric material, and/or a spontaneously-polarizable material that shows no remanence, e.g., an anti-ferroelectric material. The coercivity of the spontaneously-polarizable material may be a measure of the strength of the reverse polarizing electric field that may be required to remove a remanent polarization. In some aspects, the memory element may be remanent-polarizable, thereby providing the remanent polarization capability of the SPOC structure. In other aspects, the memory element may consist of a material that is spontaneously polarizable but shows no remanence (e.g., an anti-ferroelectric material) and additional conditions are implemented to generate an internal electric-field within the anti-ferroelectric material to thereby provide the remanent polarization capability of the SPOC structure. Hence, a non-remanent polarizable material, such as an anti-ferroelectric ("antiferroelectric") material may exhibit remanent polarizable properties within certain structures. An internal electric-field within an anti-ferroelectric material may be caused (e.g., applied, generated, maintained, as examples) by various strategies: e.g., by implementing floating nodes that may be charged to voltages different from zero volts, and/or by implementing charge storage layers, and/or by using doped layers, and/or by using electrode layers that adapt electronic work-functions to generate an internal electric field, by using an encapsulation structure which introduces compressive stress or tensile stress onto the memory element, thereby establishing the spontaneously polarizable properties, only as examples.

A spontaneous polarization (e.g., a remanent or non-remanent spontaneous polarization) may be evaluated via analyzing one or more hysteresis measurements (e.g., hysteresis curves), e.g., in a plot of polarization, P, versus electric field, E, in which the material is polarized into opposite directions. The polarization capability of a material (dielectric polarization, spontaneous polarization, and a remanence characteristics of the polarization) may be analyzed using capacity spectroscopy, e.g., via a static (C-V) and/or time-resolved measurement or by polarization-voltage (P-V) or positive-up-negative-down (PUND) measurements. Another method for determining a polarization capability of a state-programmable memory element may include transmission electron microscopy, e.g., an electric-field dependent transmission electron microscopy.

Hence, according to various aspects, the non-volatile memory 101 may be a remanent-polarizable memory, such as a remanent-polarizable non-volatile random-access memory. As an example, the remanent-polarizable non-volatile random-access memory may be a ferroelectric non-volatile random-access memory, FeNVRAM. According to other aspects, the non-volatile memory 101 may be a magnetoresistive random-access memory (MRAM) or a resistive random-access memory (RRAM). It is understood that these non-volatile memories serve as examples and that the non-volatile memory 101 may be any other kind of non-volatile memory.

The memory module 100 may include a memory interface 106. The memory interface 106 may be configured to receive data from a host 200 (e.g., a user device) via a communication channel 202 (e.g., to write the data to and/or read data from the non-volatile NAND flash storage 104). The memory interface 106 may be configured to transmit data to the host 200 via the communication channel 202 (e.g., to provide data that are read from the non-volatile NAND flash storage 104 responsive to the host 200 requesting them). The memory interface 106 may be or may include a serial AT-attachment (SATA) interface and/or a Non-Volatile Memory Express (NVMe) interface and/or a Compute Express Link (CXL) interface. Thus, the memory module 100 may be, for example, a SATA solid-state disc (SSD) or an NVMe SSD or an CXL SSD.

In the case that data are received via the memory interface 106, the data are stored in the write cache 102 (of the non-volatile memory 101) first and subsequently are written to the non-volatile NAND flash storage 104.

The memory module 100 may include a memory controller 108. The memory controller 108 may be configured to control the units of the memory module 100. Thus, the memory controller 108 may be, for example, configured to control read and/or write operations on the memory module 100. Herein, when referring to an action being carried out by at least one of the elements of the memory module 100, the memory controller 108 may be configured to control the at least one element accordingly.

Figure 2:
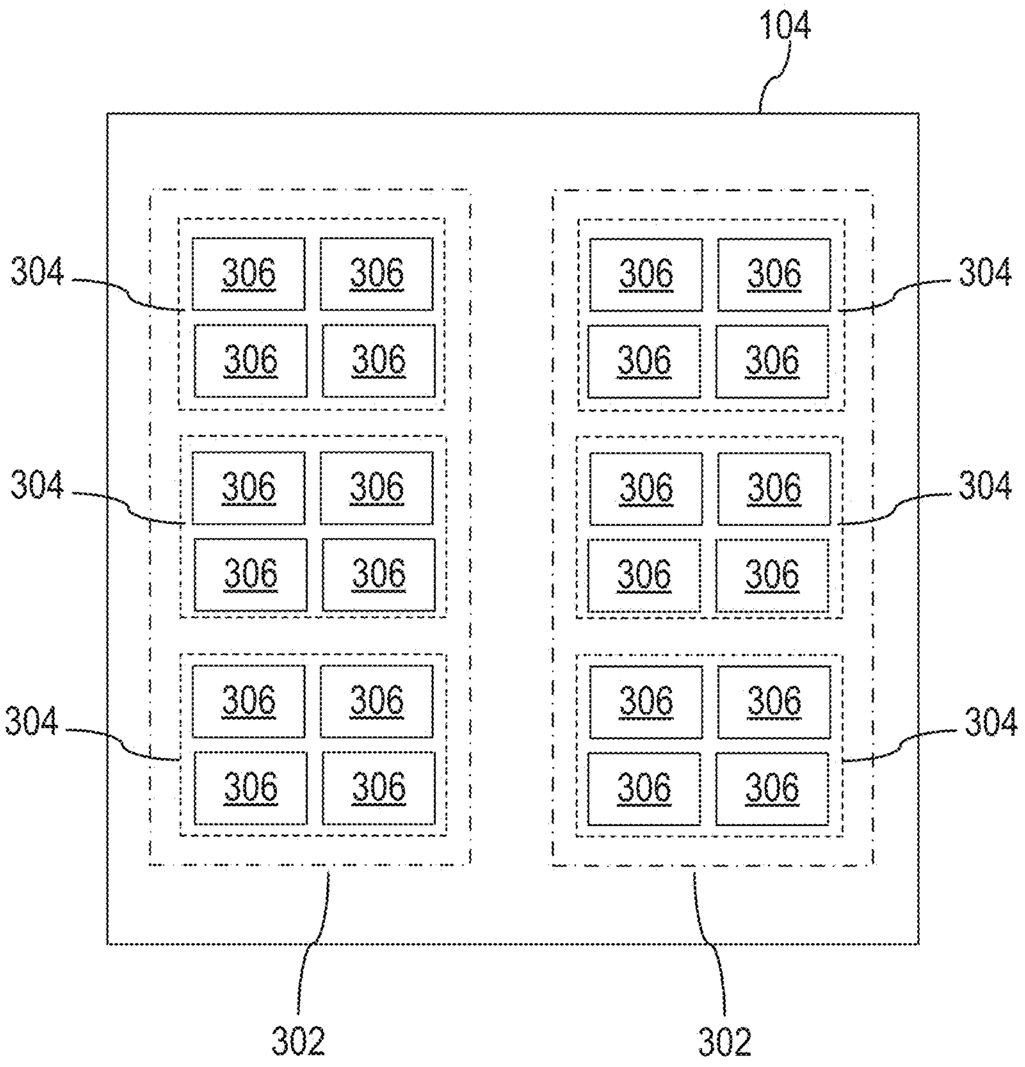
FIG. 2 schematically shows a configuration of a NAND flash storage.

FIG. 2 schematically shows an exemplary configuration of the NAND flash storage 104. The NAND flash storage 104 may include one or more dies (e.g., a package including one or more dies). Each die of the one or more dies includes one or more planes (e.g., exactly one plane or two planes). Each plane of the one or more planes 302 may include a plurality of blocks 304. Each block of the plurality of blocks 304 may include a plurality of pages 306 (may also be referred to as page frame).

All pages of the plurality of pages 306 may have a same size (e.g., 4 kB or larger) for storing page data. Thus, when referring to page data herein, it may be referred to a data portion having the size of one page. Hence, the term "page" with reference to the non-volatile NAND flash storage 104 may refer to a storage region on the non-volatile NAND flash storage 104 that can store data having the size of one page (short: page size).

Page data may be written to a single page of the plurality of pages 306 of a block to store the page data on the non-volatile NAND flash storage 104. To read page data from the non-volatile NAND flash storage 104, a single page storing the page data may be read. Illustratively, a write operation and a read operation may be carried out on a single page. Hence, a page is the smallest physically addressable unit of a read operation and of a write operation, whereas a block is the smallest physically addressable unit of an erase operation.

Once page data are written to a page of the non-volatile NAND flash storage 104, the page has to be erased before new page data can be written to the page. Due to the configuration of the non-volatile NAND flash storage 104, a page cannot be erased by its own, but all pages of the block the page belongs to have to be erase. Hence, an erase operation has to be carried out on the plurality of pages 306 of a block 304.

The memory controller 108 may be configured to manage page data received via the memory interface 106. Managing the page data may also be referred to as managing host-interface logic (HIL).

In order to write data to the non-volatile NAND flash storage 104, the host 200 may transmit page data (viz. data having the size of a page) together with a logical block address (short: logical address) of the page data via the communication channel 202. The memory module 100 may include a flash translation layer (FTL) for logical-to-physical (L2P) address translation, hence for mapping the logical address of the page data to a physical block address (short: physical address) on the non-volatile NAND flash storage 104 where the page data are stored. Thus, the physical address may also be referred to as NAND (block) address. The flash translation layer may include a logical-to-physical (L2P) mapping table. The L2P table may include the logical address and the physical address of the page data. The physical address may include a block number indicating a block 304* of the non-volatile NAND flash storage 104 and a page number indicating the page 306* of the block 304* indicated by the block number. Herein, the *-notation may define one specific element of a plurality of elements. Hence, the page 306* may refer to a specific page of the plurality of pages 306. Illustratively, the logical addresses may provide an abstract (e.g., virtual) address for software to interact with the memory module 100, whereas the physical addresses represent actual hardware locations on the memory module 100.

Thus, in the case that the memory module 100 receives first page data associated with a logical address from the host 200, the memory controller 108 may determine, whether there is an entry for this logical address in the UP table.

In the case that there is no entry for this logical address in the L2P table, the first page data may be written to a (erased) page of the non-volatile NAND flash storage 104 and the physical address of this page is added to the L2P table together with the logical address of the first page data.

In the case that there is an entry for this logical address in the L2P table already, the memory controller 108 may determine that the received first page data are an update to second page data stored in a second page of the non-volatile NAND flash storage 104. The first page data may be a modification of the second page data (or may be the same page data; however, the memory module 100 might not know whether there is a change to the page data or not). Since new page data have to be written to an erased page of the non-volatile NAND flash storage 104, the first page data may b written to a (erased) third page (different from the second page). Once the first page data are written to the third page, the second page data are old (viz. obsolete). However, since the pages of the non-volatile NAND flash storage 104 can only be erased block-wise, the second page cannot be erased until all pages of the block the second page belongs to are obsolete.

In order to know whether the page data of a page are obsolete or not, the memory module 100 may include a page table. The page table may include for each page data entry one or more of: a frame number of the page data, the physical address of the page storing the page data, and/or a valid/invalid indicator indicating whether the page is valid or invalid. The page data are indicated as "valid" when not being obsolete (then referred to as valid page data) and are indicated as "invalid" when being obsolete (then referred to as invalid page data). Herein, when referring to a valid page, it may be referred to valid page data stored in the page which is referred to as valid page. Accordingly, when referring to an invalid page, it may be referred to invalid page data stored in the page which is referred to as invalid page. Illustratively, in the case that page data are indicated as valid, the page data are the current (viz. latest) version stored in the non-volatile NAND flash storage 104 for the associated logical address. A valid page may also be referred to as used page. An invalid page may also be referred to as stale page. The page data indicated as invalid are outdated and can be erased. Page data stored in the write cache 102 may be indicated as being either dirty or clean. In the case that page data are indicated as clean, the page data are also stored (viz. are present) in the non-volatile NAND flash storage 104. Accordingly, in the case that page data are indicated as dirty, the page data stored in the write cache 102 are not present in the non-volatile NAND flash storage 104. Illustratively, page data that are indicated as clean may be stored in the write cache 102 as well as in the non-volatile NAND flash storage 104. According to various aspects detailed herein, when using the non-volatile memory 101 as write cache 102, a page can be invalidated in the non-volatile NAND flash storage 104 once it is dirty in the write cache 102.

As detailed herein, since page data stored in a page in the non-volatile NAND flash storage 104 cannot be overwritten, pages storing outdated page data (viz. a page or page data indicated as invalid) have to be erased. However, since pages cannot be erased by themselves, but on a block-level only, blocks having only invalid pages have to be generated in order to allow to erase them. For this, in the case that a block still includes some valid pages, the page data stored in these valid pages have to be written (internally) to other pages in the non-volatile NAND flash storage 104. This process is called garbage collection. In order to generate a block having invalid pages only, the page data of each valid page of the block may be stored in the write cache 102 and then written to another page in the non-volatile NAND flash storage 104. Once the page data are written to the other page, the previously valid page may be indicated as invalid in the page table and the page metadata may be updated (viz. the physical address of the other page may be linked to the logical address of the page data in the L2P table). Hence, garbage collection may include, for each page storing page data that are to be rewritten to another page, reading the page data to the write cache 102, writing the page data to the other page on the non-volatile NAND flash storage 104, and updating the page metadata (viz. the page table for the initial page (by indicating the initial page as invalid), the page table for the other page by linking the page data to the physical address of the other page, and the L2P table by linking the logical address to the physical address of the other page).

Hence, due to receiving page data having a logical address that is associated with a physical address, more and more pages of the non-volatile NAND flash storage 104 get invalided (viz. store obsolete page data) and, at some point, no erased pages may be available for writing received page data. Therefore, garbage collection may be required in order to ensure that erased pages are available.

Thus, the garbage collection may lead to a high number of internal write operations (of rewriting page data on the non-volatile NAND flash storage 104). Illustratively, garbage collection may result in a high number of internal write operations which are not intended by the host 200. This may lead to a write amplification, where the number of physical writes (e.g., the actual amount of information physically (e.g., internally and externally) written to the non-volatile NAND flash storage 104) is a multiple of the number of logical writes (viz. the logical amount of information (externally) written to the non-volatile NAND flash storage 104). Hence, write amplification may indicate that the amount of data physically written to the memory module 100 is higher than the logical amount of data intended to be written to the memory module 100. A high level of write amplification may slow down the input/output (I/O) of the memory module 100 and may worsen the lifespan of the memory module 100.

Due to the high number of pages that store invalid page data and, thus, cannot be written by new page data, the non-volatile NAND flash storage 104 may include a higher number of storage capacity than shown to the host 200. The excess amount of storage capacity may be used for garbage collection. Providing such an excess amount of storage capacity may be referred to as overprovisioning. Illustratively, overprovisioning is a difference between the physical capacity of the flash storage and the logical capacity presented through the operating system (OS) as available for the user.

Once an erase operation is carried out on a block 304* of the non-volatile NAND flash storage 104, the plurality of pages 306 of this block 304* are erased. Herein, such a page (which does not store any page data) may be referred to as an erased page. Hence, an erased page may refer to an empty region on the non-volatile NAND flash storage 104 on which page data can be written. An erased page may also be referred to as free page (since its free to be written).

It is understood that the L2P table and the page table described herein are examples and that page metadata may include any kind of (organized) data structure which allows to map a logical address to a physical address, to indicate a page as either valid or invalid, and to indicate page data stored in the write cache 102 as either dirty or clean. At least part of the page metadata may be stored in the non-volatile NAND flash storage 104 to ensure persistent storage and may be cached to the memory that provides the write cache 102 to reduce latency during mapping lookups.

In the prior art, the write cache is a volatile write cache, such as typically a volatile dynamic random-access memory (DRAM). Using the DRAM write cache increases the speed of writing data to and/or reading data from the non-volatile flash storage, thereby mitigating the limitations of the non-volatile flash storage. In the following, various aspects are described for the prior art scenario of having a volatile write cache, such as DRAM, with reference to FIG. 3A to FIG. 3D.

Figure 3A:
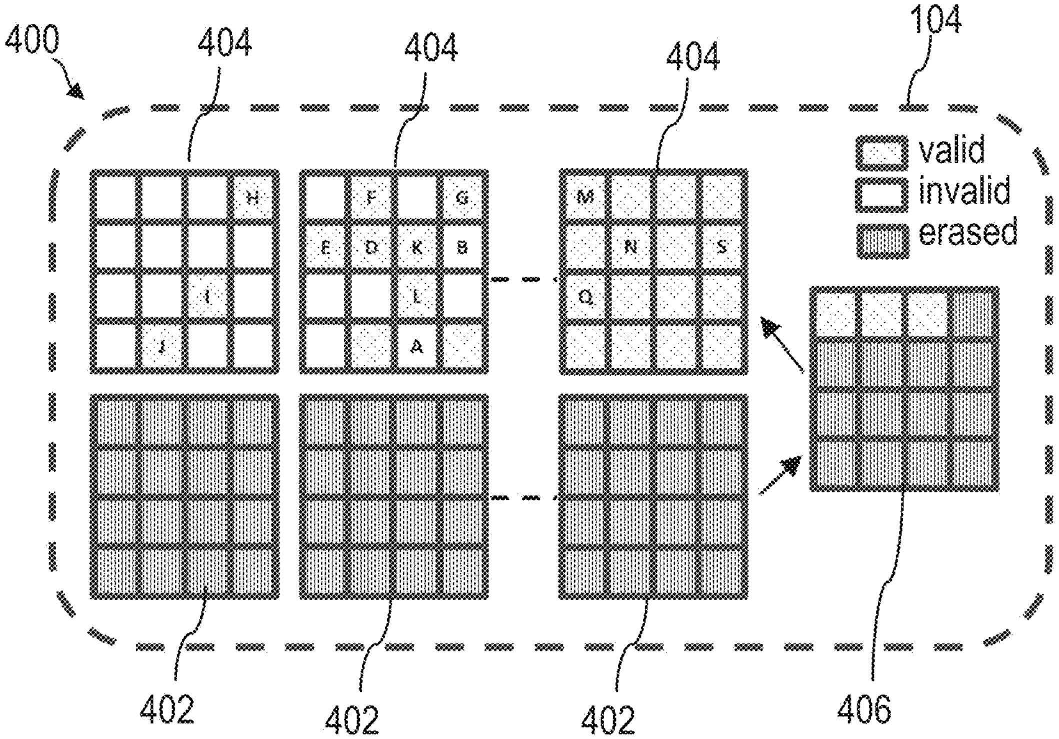
FIG. 3A to FIG. 3C each show various aspects of writing page data into the NAND flash storage.
Figure 3A:
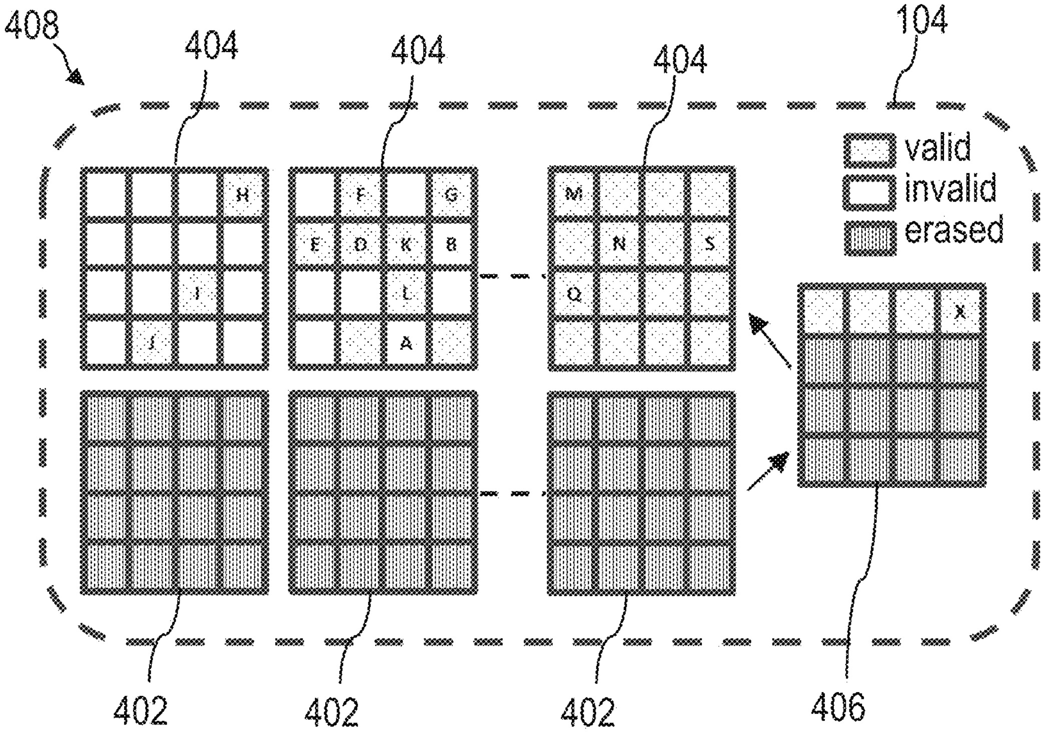
Figure 3B:
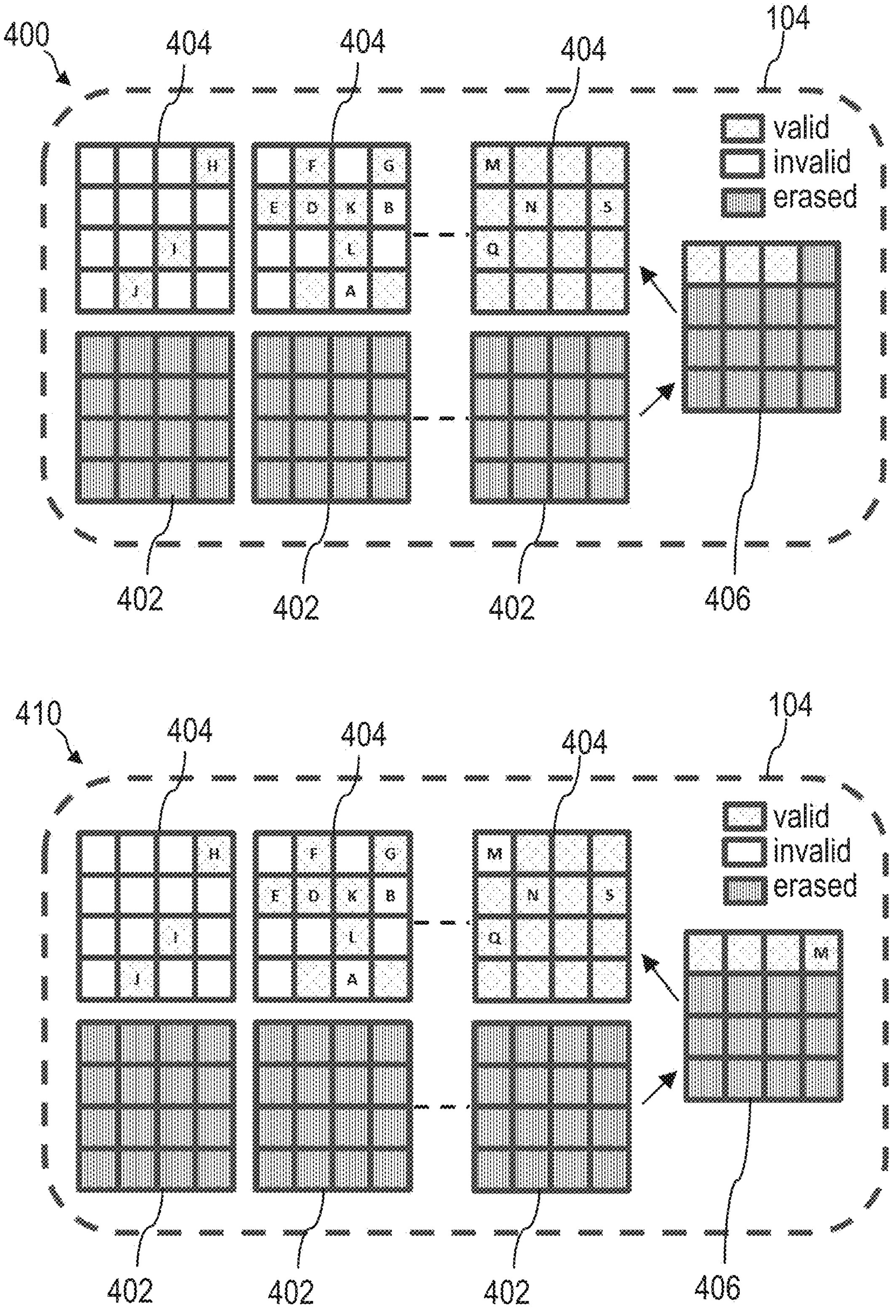
Figure 3C:
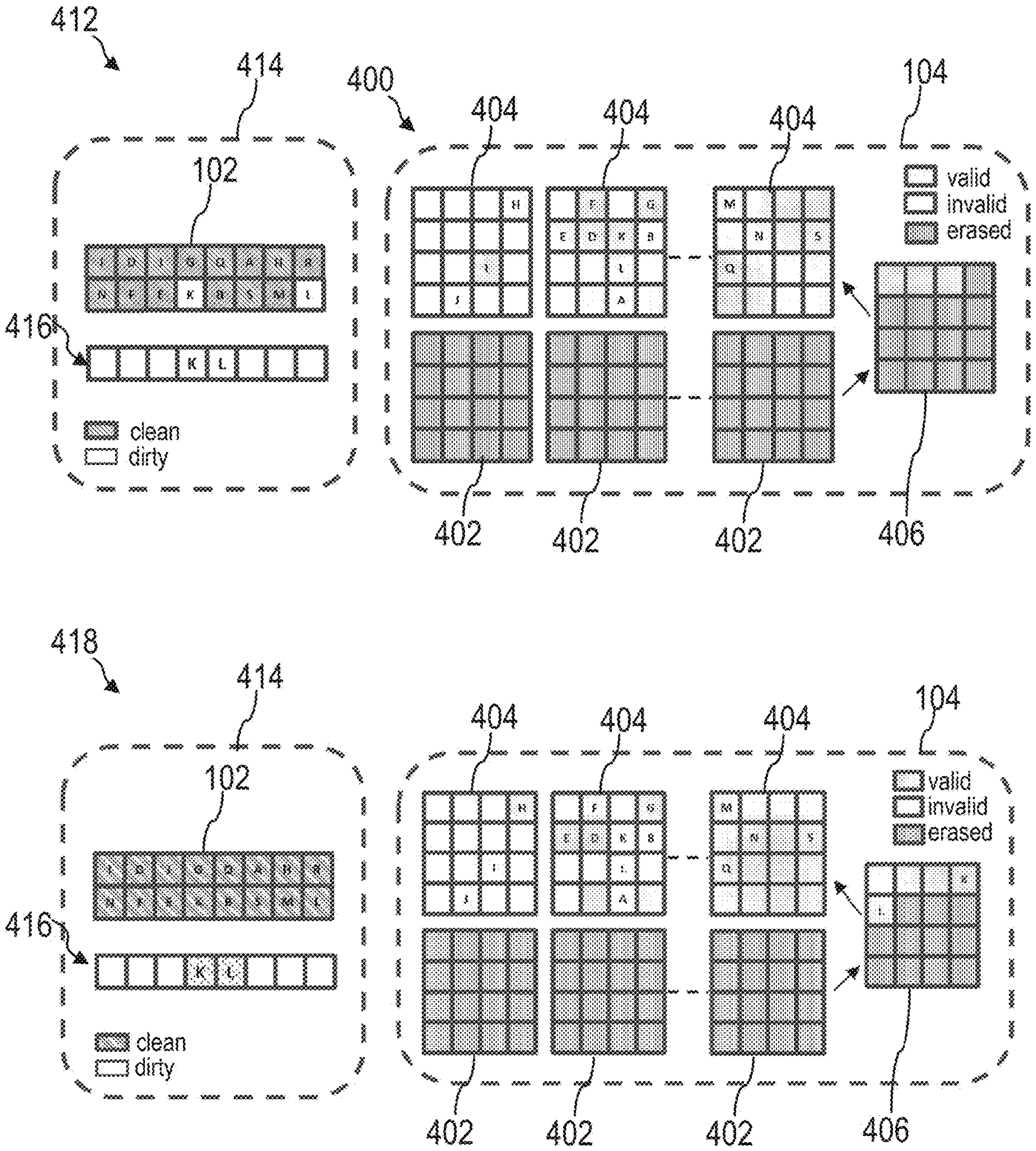

FIG. 3A to FIG. 3C each show an initial configuration 400 of the non-volatile NAND flash storage 104 including erased blocks 402 (with each erased block including erased pages only) (erased blocks may also be referred to as empty blocks), written blocks 404 (including pages that are either valid or invalid (but not erased), and an active write block 406 (including at least one erased page that is to be written next). The memory controller 108 may be configured to select the active write block 406 from the (collection of) erased blocks 402. Once the active write block 406 is completely filled (viz. each page thereof includes respective page data (indicated as valid or invalid)), a next active write block 406 may be selected from the (collection of) erased blocks 402. Once page data are written to a page of the active write block 406, the page is indicated as valid.

Assigning a page having a corresponding logical address to an erased page of the active write block 406 may also be referred to as a page allocation scheme. FIG. 3C shows the memory 414 that provides the write cache 102. The page metadata 416 may also be cached to this memory 414. In the prior art, this memory 414 may be a volatile memory 414 (e.g., a DRAM) providing the volatile write cache.

In the figures, various pages are indicated by a letter for illustration. Herein, a letter may refer to page data being associated with a corresponding logical address. Thus, the letter may include a specific logical address. Thus, in the case that the memory module 100 receives page data having a letter that is already present for a page the non-volatile NAND flash storage 104, this may indicate that page data having the logical address are already stored in the non-volatile NAND flash storage 104 and, hence, are an updated to previously stored page data.

As a first example, the memory module 100 may receive first page data associated with a first logical address "X". First, the first page data may be stored in the write cache and the first page data may be indicated as dirty (viz. not yet written to the non-volatile NAND flash storage 104). For example, the memory controller 108 (implementing the HIL and the FTL) may control the memory module 100 to store the first page data in the write cache, may check, whether there is a physical address associated with the logical address in the L2P table, include the first page data in the page table and indicate the first page data in the page table as dirty (since they are not yet written to the non-volatile NAND flash storage 104). Since, in this first example, the non-volatile NAND flash storage 104 does not store page data associated with this first logical address "X" (viz. there is no physical address for this first logical address "X" in the L2P table), the first page data are (newly) written to the active write block 406 of the non-volatile NAND flash storage 104, as shown in the target configuration 408 (bottom image) in FIG. 3A.

As a second example, with reference to FIG. 3B, the memory module 100 may receive second page data associated with a second logical address "M". First, the second page data may be stored in the write cache and the second page data may be indicated as dirty (viz. not yet written to the non-volatile NAND flash storage 104). For example, the memory controller 108 (implementing the HIL and the FTL) may control the memory module 100 to store the second page data in the write cache, may check, whether there is a physical address associated with the logical address in the L2P table, include the second page data in the page table and indicate the second page data in the page table as dirty (since they are not yet written to the non-volatile NAND flash storage 104). Since, in this second example, the non-volatile NAND flash storage 104 does store page data associated with this second logical address "M" (viz. there is a physical address for this second logical address "M" in the L2P table), the second page data are determined as being an update to the previously stored page data and are written to the active write block 406 of the non-volatile NAND flash storage 104. Since all page data stored in the volatile (e.g., DRAM) write cache would be lost in the case of a power loss, the page data, that are associated with the second logical address "M" and that are stored in the non-volatile NAND flash storage 104 when receiving the second page data, are kept as being valid until the second page data are written to the non-volatile NAND flash storage 104 and until the page metadata (e.g., the L2P table) are updated to map the second logical address "M" to the physical address of the page in the active write block 406 to which the second page data are written. Once the second page data are written to the non-volatile NAND flash storage 104, the second page data are stored non-volatilely and the page previously storing the page data associated with the second logical address "M" is indicated as invalid, as shown in the target configuration 410 (bottom image) in FIG. 3B.

As a third example, with reference to configuration 412 in FIG. 3C, the memory module 100 may receive third page data associated with a third logical address "K" and fourth page data associated with a fourth logical address "L". First, the third page data and the fourth page data may be stored in the write cache 102 and may be indicated as dirty (viz. not yet written to the non-volatile NAND flash storage 104). Since the page metadata 416 include a physical address of the third logical address "K" and include a physical address of the fourth logical address "L", the third page data and the fourth page data are determined as being an update to previously stored page data and are written to the active write block 406 of the non-volatile NAND flash storage 104. Once the third page data and the fourth page data are written to the non-volatile NAND flash storage 104, the metadata are updated to their respective new physical address and the page data previously stored for the third logical address "K" and for the fourth logical address "L" are indicated as invalid, as shown in the target configuration 418 in FIG. 3C. Having a volatile memory that provides the (volatile) write cache and page metadata cache may require syncing any dirty pages to storage backend to ensure cache coherence.

In the case that the host 200 transmits page data to the memory module 100, the memory module 100 may be configured to notify the host 200 that it received the page data. For example, the memory module 100 may be configured to transmit an acknowledgement message to the host 200 indicating reception of the page data. Prior art memory modules having a volatile write cache, such as a DRAM, may be operated in a write cache enabled mode or in a write cache disable mode. In the write cache enable mode, the acknowledgement message may be sent upon storing the received page data in the volatile write cache. Thus, in the event of a system failure, such as a sudden loss of power, the page data stored in the volatile write cache may be lost after sending the acknowledgement message. In the write cache disabled mode, the acknowledgement message may be sent upon writing the received page data into the non-volatile (NAND) flash storage 104. Thus, the acknowledgement message is sent only after non-volatilely storing the received page data. The write cache disabled mode prevents the risk of data loss, but has a reduced performance as compared to the write cache enabled mode. Thus, there has to be a decision whether an increase of performance provided by the write cache enabled mode justifies the risk of data loss. The non-volatile write cache detailed herein allows to provide both, to prevent the risk of data less while at the same time providing the high performance of the write cache enabled mode.

Figure 3D:
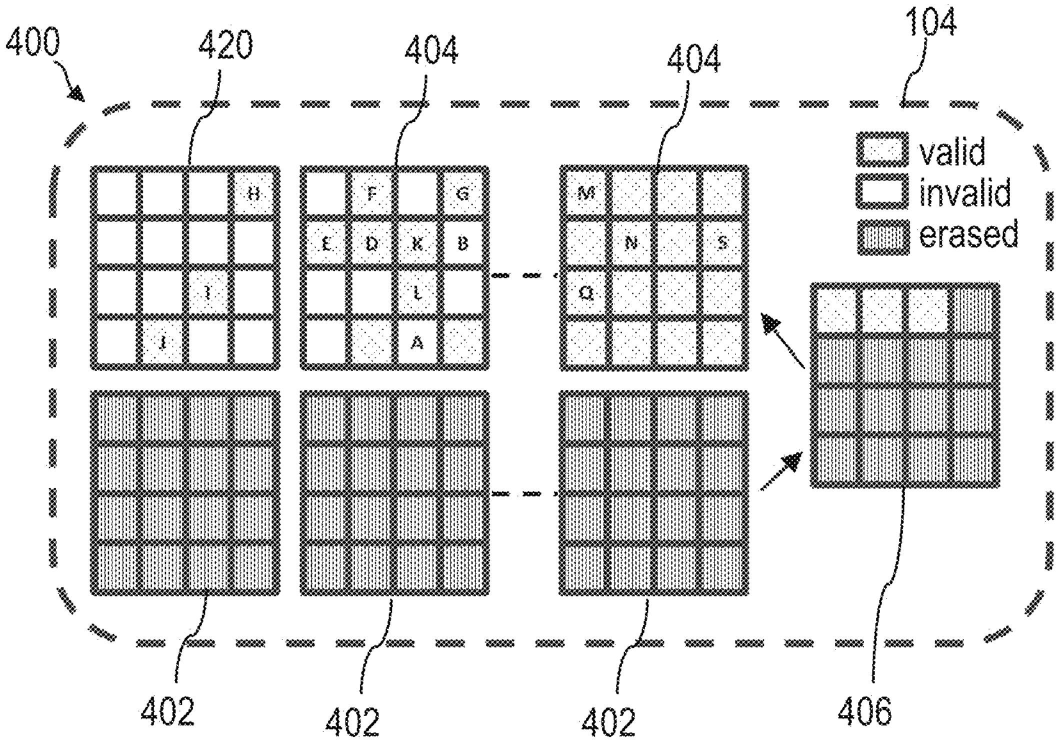
FIG. 3D shows various aspects of erasing a block of the NAND flash storage.
Figure 3D:
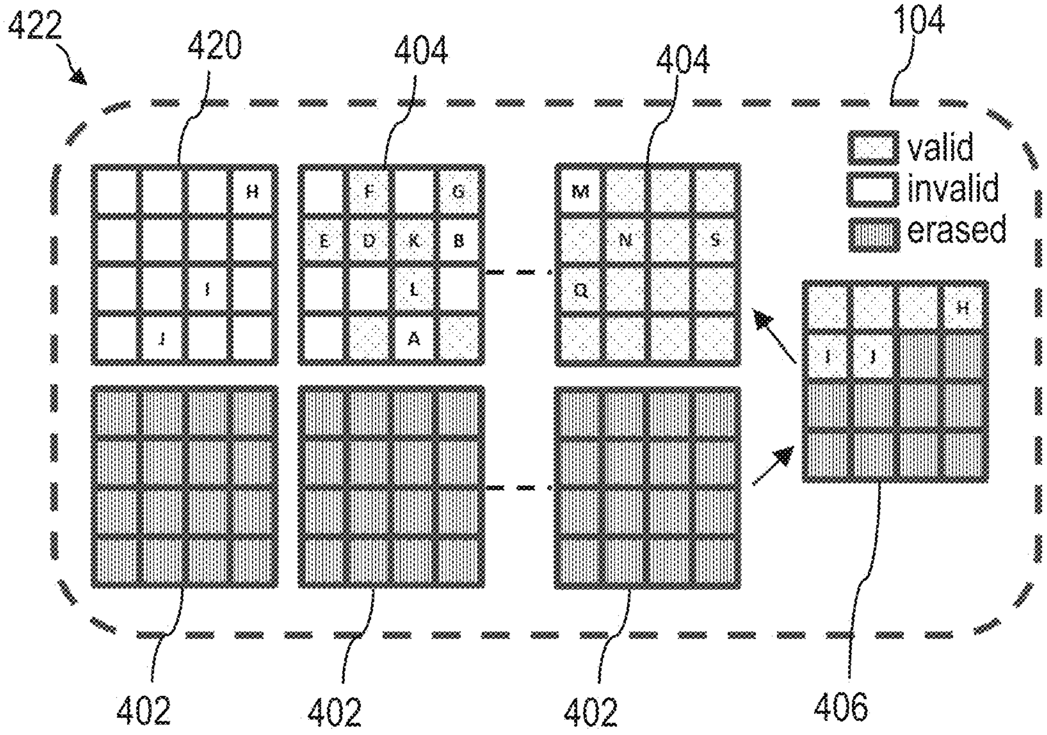

FIG. 3D shows various aspects of a garbage collection (process). As detailed herein, garbage collection refers to erasing blocks of the non-volatile NAND flash storage 104 in order to generate erased blocks 402 which then can be written with page data. For this, page data from valid pages of a block that is to be erased may be written to the active write block 406.

The memory controller 108 may be configured to select a block 420 of the written blocks 404 for erasure. For example, the memory controller 108 may be configured to select the block 420 of the written blocks 404 which has the lowest number of pages that are indicated as valid.

In FIG. 3D, this is the block including only the three valid pages having the logical addresses "H", "I", and "J". In the prior art, the valid pages "H", "I", and "J" may be read to the write cache and then may be written to the active write block 406. Once being written to the active write block 406, the pages of the active write block 406 to which the pages (having the logical addresses "H", "I", and "J") are written are indicated as valid, the pages having the logical addresses "H", "I", and "J" of the selected block 420 may be indicated as invalid, and the page metadata may be updated to map the logical addresses "H", "I", and "J" to the pages of the active write block 406 to which the pages (having the logical addresses "H", "I", and "J") are written. Consequently, the selected block 420 includes invalid pages only and can be erased, as shown in the target configuration 422 in FIG. 3D. Once being erased, this block 420 may be added to the (collection of) erased blocks 402.

Further, the page metadata may be stored in this non-volatile memory. Thus, according to various aspects, it may not be required to store the page metadata in the non-volatile NAND flash storage 104 and to cache them into the caching memory since the non-volatile write cache 102 itself allows persistently store the page metadata.

As detailed herein, using the non-volatile write cache 102 allows to reduce write amplification, thereby speeding up the storage of (user) data and reducing the amount of required write-erase cycles. This prolongs the lifetime of the memory module 100. Further, using the non-volatile write cache 102 increases overprovisioning without added cost.

Figure 4A:
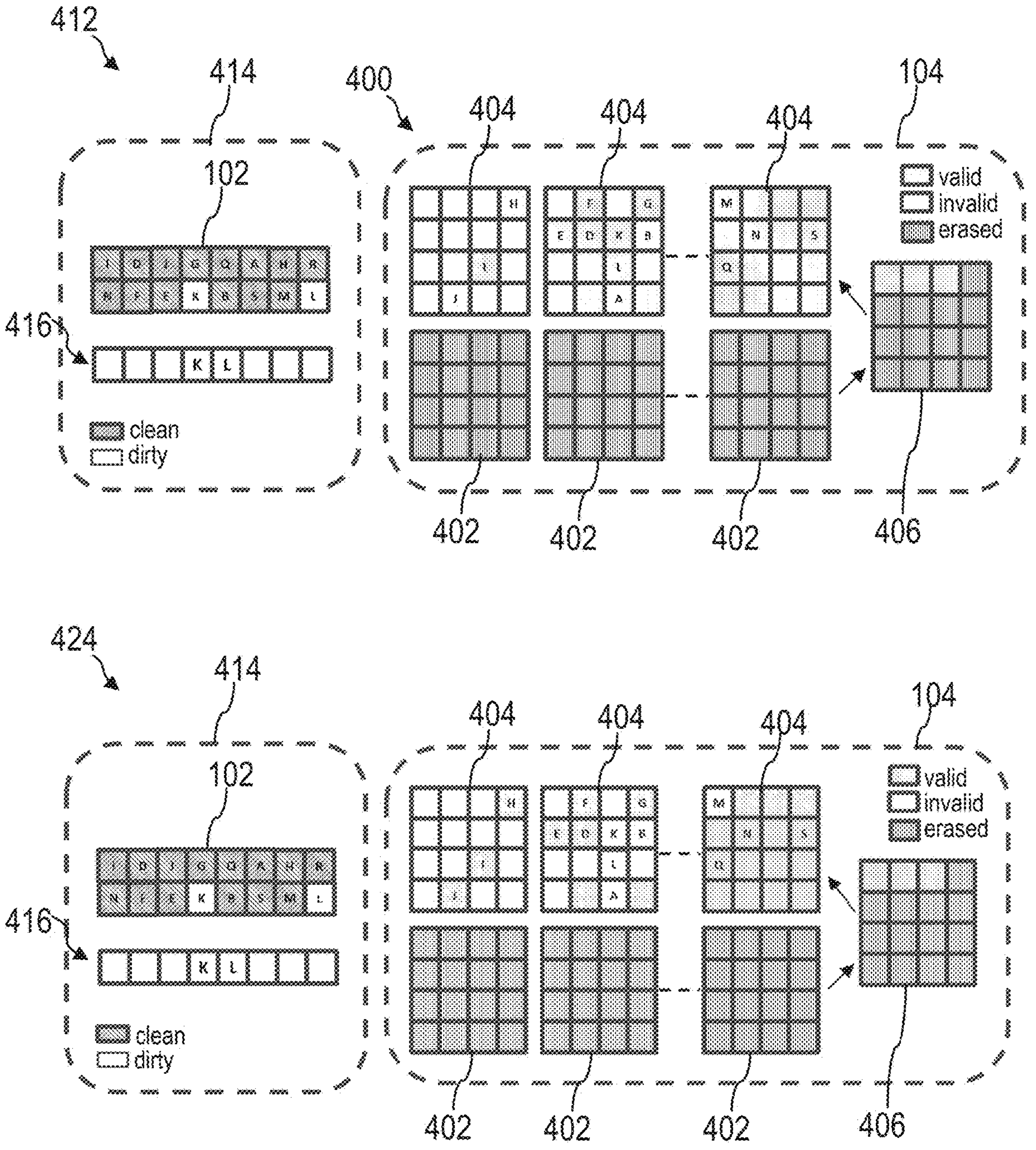
FIG. 4A shows various aspects of updating page data in the NAND flash storage employing a non-volatile write cache according to various aspects.
Figure 4B:
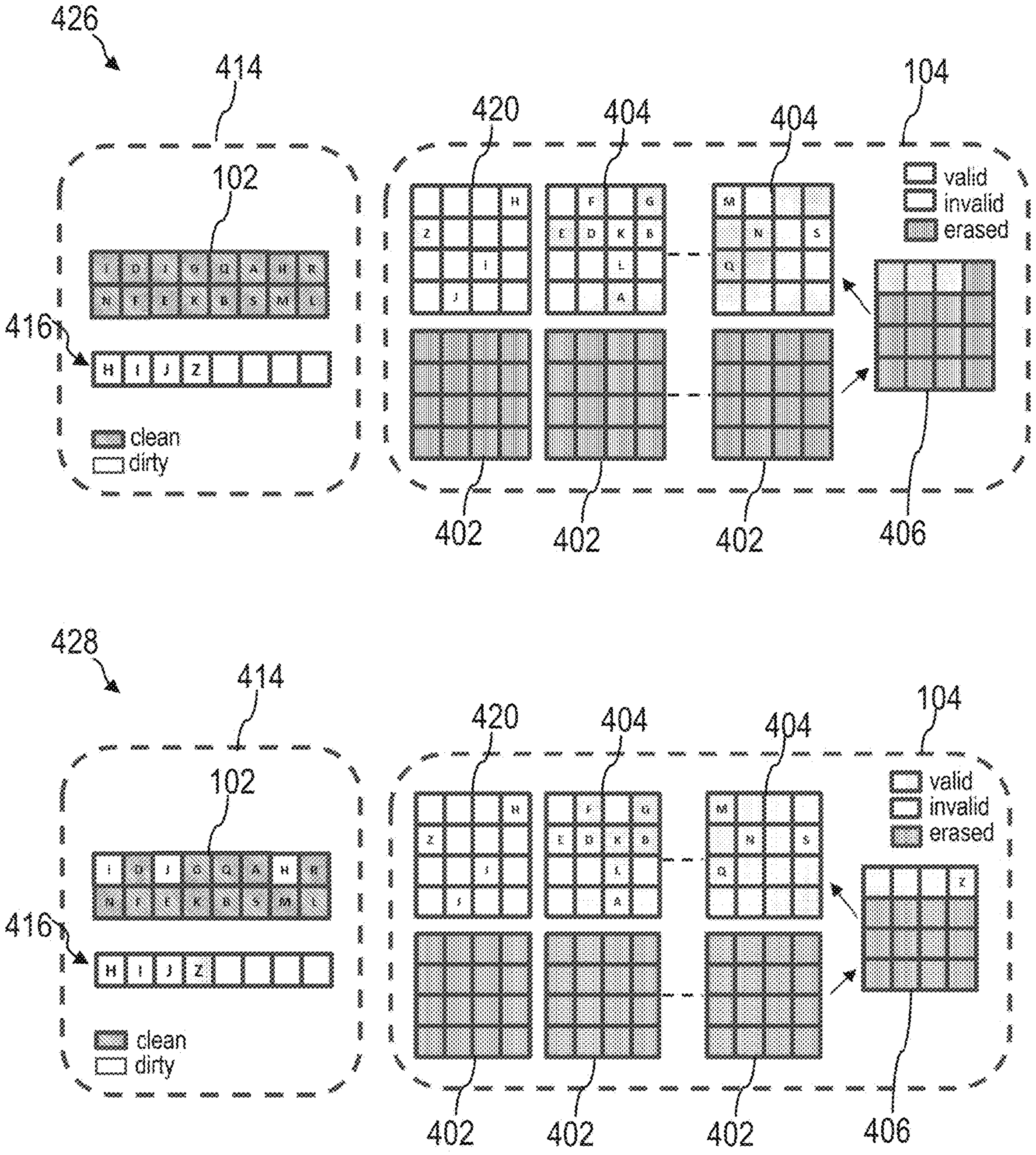
FIG. 4B and FIG. 4C show various aspects of erasing a block of the NAND flash storage employing a non-volatile write cache according to various aspects.
Figure 4C:
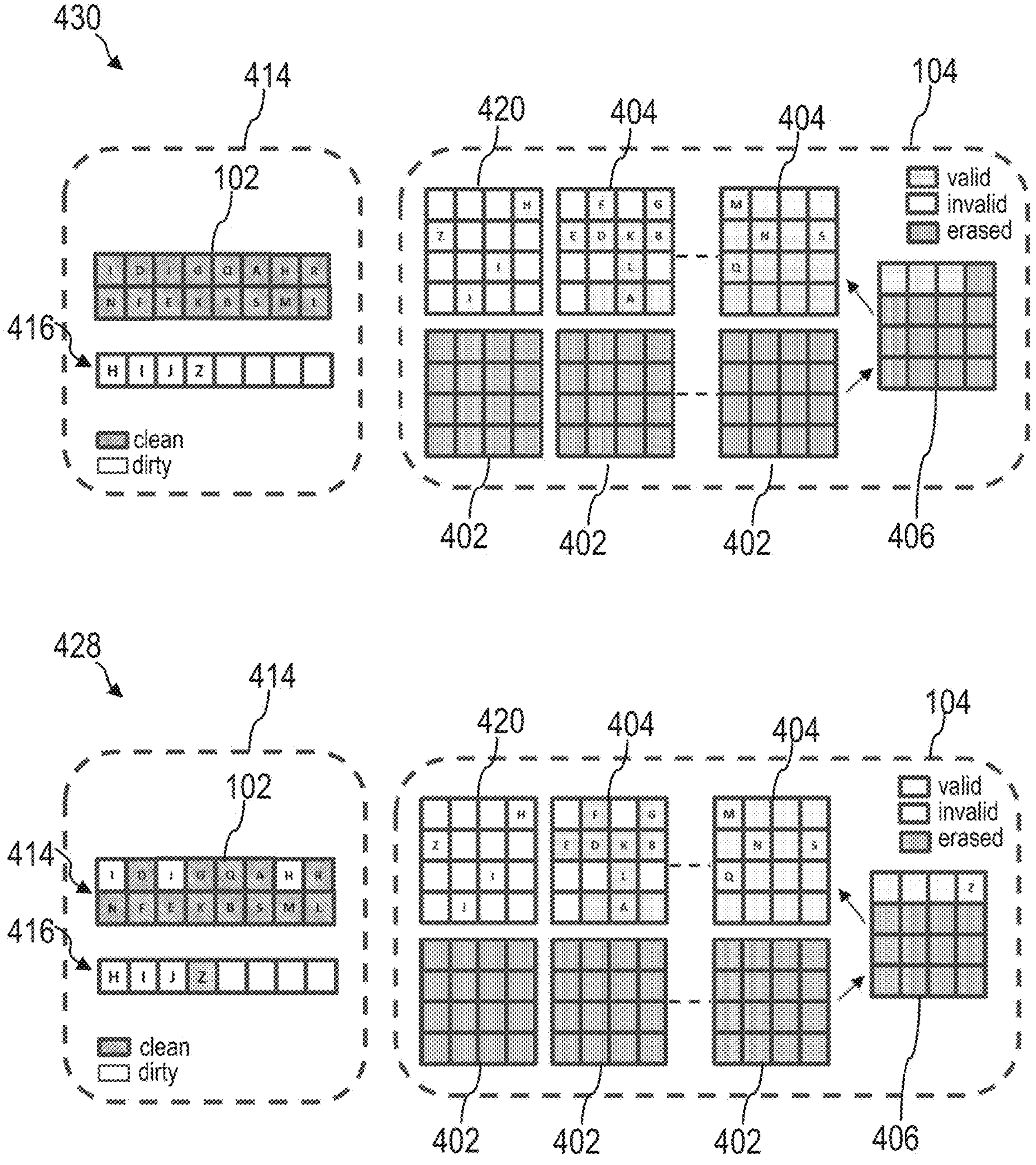

FIG. 4A to FIG. 4C each shows various aspects of employing the non-volatile write cache 102. Hence, the memory 414 providing the write cache 102 (and optionally the cache for the page metadata) may be a non-volatile memory 414.

As detailed with reference to the configuration 412 in FIG. 3C, the memory module 100 may receive the third page data associated with the third logical address "K" and the fourth page data associated with the fourth logical address "L".

The third page data and the fourth page data may be stored in the write cache 102 and may be indicated as dirty (viz. not yet written to the non-volatile NAND flash storage 104). Since the page metadata 416 include the physical address of the third logical address "K" and include the physical address of the fourth logical address "L", the third page data and the fourth page data are determined as being an update to previously stored third page data store in a previous third page and to previously stored fourth page data store in a previous fourth page, respectively, on the non-volatile NAND flash storage 104.

In contrast to having a volatile write cache as detailed with reference to FIG. 3C, using the non-volatile write cache 102 does not have the risk of losing the page data (in this example the third page data and the fourth page data) stored in the non-volatile write cache 102.

Therefore, in contrast to having a volatile write cache as detailed with reference to FIG. 3C, using the non-volatile write cache 102 does not require to write the received third page data and the received fourth page data into the non-volatile NAND flash storage 104 prior to indicating the previously stored third page data stored in the previous third page and the previously stored fourth page data stored in the previous fourth page as invalid.

Hence, according to various aspects, the memory controller 108 may be configured to indicate the previous third page and the previous fourth page in the non-volatile NAND flash storage 104 as invalid prior to writing the third page data and the fourth page data into the non-volatile NAND flash storage 104, as shown in configuration 424 in FIG. 4A.

Thus, in contrast to having a volatile write cache, using the non-volatile write cache 102 allows a situation in which the page data stored in the non-volatile NAND flash storage 104 are indicated as invalid while updated page data (representing an update to these page data) stored in the non-volatile write cache 102 are (still) indicated as dirty (viz. not yet written to the non-volatile NAND flash storage 104).

As detailed herein, using a volatile write cache requires to write the page data from the write cache into the non-volatile NAND flash storage 104 and setting the page data in the write cache as clean prior to indicating the previously stored page data in the non-volatile NAND flash storage 104 as invalid due to the risk of losing the data in the write cache in the case of a power loss. Using the non-volatile write cache 102 on the other hand allows to decouple the dirty/clean status of a write cache page from the status of the corresponding page in the non-volatile NAND flash storage 104 (due to persistent data storage in both, the non-volatile write cache 102 and the non-volatile NAND flash storage 104). This reduces write amplification significantly.

Since the previous third page and the previous fourth page in the non-volatile NAND flash storage 104 can be indicated as invalid prior to writing the third page data and the fourth page data into the non-volatile NAND flash storage 104 (see configuration 424 in FIG. 4A), writing the third page data and the fourth page data into the non-volatile NAND flash storage 104 can be delayed to a suitable point in time. Illustratively, using the non-volatile write cache 102 allows to write page data from the non-volatile write cache 102 to the non-volatile NAND flash storage 104 opportunistically.

Indicating the previous third page and the previous fourth page in the non-volatile NAND flash storage 104 as indicated as invalid prior to writing the third page data and the fourth page data into the non-volatile NAND flash storage 104 allows to erase a block (or the blocks) including the previous third page and the previous fourth page even before the third page data and the fourth page data are (completely) written the non-volatile NAND flash storage 104.

For example, the block (or the blocks) may be erased prior to writing the third page data and the fourth page data into the non-volatile NAND flash storage 104.

For example, there may be a temporal overlap between erasing the block (or the blocks) and writing the third page data and the fourth page data into the non-volatile NAND flash storage 104. Hence, the block (or the blocks) may be erased concurrently with writing the third page data and the fourth page data into the non-volatile NAND flash storage 104.

Illustratively, the block (or the blocks) can be erased at an earlier point in time as compared to having a volatile write cache, thereby allowing to faster reclaim erased blocks and, hence, increasing the speed of the garbage collection process.

Further, since the writing of the page data from the non-volatile write cache 102 to the non-volatile NAND flash storage 104 is independent of erasing the block storing the previous page data, the write procedure and the erase procedure can be coordinated and, thus, conflicts between writing received page data to the non-volatile NAND flash storage 104 and erasing blocks for garbage collection can be reduced.

According to various aspects, writing page data from the non-volatile write cache 102 to the non-volatile NAND flash storage 104 may be delayed for a predefined time period. In the case that these page data are (again) updated by the host, the first received page data do not have to be written to the non-volatile NAND flash storage 104. Hence, in the case that page data associated with a specific logical address are updated often, these page data may be stored in the non-volatile write cache 102 and may only be written to the non-volatile NAND flash storage 104 once they do not change for the predefined time period. With this, the number of write operations of writing page data to the non-volatile NAND flash storage 104 can be reduced significantly, thereby enhancing the performance of the memory module 100.

It is understood that the example referring to the third page data and the fourth page data serves for illustration and that the aspects described with reference thereto may apply to any kind of received page data.

Conventional memory modules having a volatile write cache may be operated in a write cache enabled mode, in which an acknowledgement message is send upon storing received page data in the write cache, or in a write cache disabled mode, in which the acknowledgement message is send upon storing received page data in the non-volatile NAND flash storage 104. In the write cache enabled mode, after sending the acknowledgement message, in the event of a power, the page data stored in the volatile write cache may be lost; however, the write cache enabled mode improves performance of the memory module 100.

Using the non-volatile write cache 102 as detailed herein prohibits the risk of losing page data, thereby providing the performance increase of the write cache enabled mode at any time. Therefore, according to various aspects, the memory controller 108 may be configured to (always) send the acknowledgement message (to acknowledge reception of the (received) page data) to the host 200 once the received page data are stored in the non-volatile write cache 102. Illustratively, using the non-volatile write cache 102 does not require any trade-off between a write cache enabled mode and a write cache disabled mode, but provides the advantages of both at the same time.

As detailed herein, in the case that page data are received having a logical address to which a physical address is assigned already (viz. updated page data are received associated with previously stored page data), the page data stored in the page indicated by the physical address may be indicated as invalid prior to writing the received page data into the non-volatile NAND flash storage 104.

Such an exemplary configuration 426 is shown in FIG. 4B. In this example, the memory module 100 may receive fifth page data associated with a fifth logical address "H", sixth page data associated with a sixth logical address "I", and seventh page data associated with a seventh logical address "J". Each of the fifth logical address "H", the sixth logical address "I", and the seventh logical address "J" may be mapped to a respective physical address in the L2P table, thus being associated with respective page data stored in the non-volatile NAND flash storage 104. The fifth page data, the sixth page data and the seventh page data may be stored in the non-volatile write cache 102 and indicated as dirty.

As shown in FIG. 4B, this results in a configuration 426 in which block 420 has only one valid page storing eighth page data that are associated with an eighth logical address "Z".

Hence, to erase the block 420 for garbage collection, only the eighth page data have to be stored in (e.g., read to) the non-volatile write cache 102. Once the eighth page data are stored in the non-volatile write cache 102, the block 420 can be erased.

The eighth page data may (e.g., later on) be written to the active write block 406 of the non-volatile NAND flash storage 104 and the page metadata 416 may be updated for the eighth page data only (e.g., the eighth logical address "Z" may be mapped to the physical address of the page into which the eighth page data are written in the active write block 406), as shown in configuration 428 in FIG. 4B.

Hence, this example illustratively shows the speed enhancement of the garbage collection process. As shown, indicating the pages in the non-volatile NAND flash storage 104 that are associated with the fifth logical address "H", the sixth logical address "I", and the seventh logical address "J" as invalid prior to writing the fifth page data, the sixth page data and the seventh page data to the non-volatile NAND flash storage 104 results in less valid pages per block and, thus, to (temporally) shorter block erase cycles.

FIG. 4C shows a configuration 430 in which all pages of the non-volatile write cache 102 are indicated as clean, viz. in which the respective page data of all pages of the non-volatile write cache 102 are written to the non-volatile NAND flash storage 104.

For garbage collection, block 420 may be selected as the one to be erased.

In this example, the block 420 may include ninth page data associated with the fifth logical address "H", tenth page data associated with the sixth logical address "I", eleventh page data associated with the seventh logical address "J", and twelfth page data associated with the eighth logical address "Z" which are indicated as valid. The other pages may be indicated as invalid.

The memory controller 108 may be configured to determine, for each of these page data indicated as valid, whether the page data are stored in the non-volatile write cache 102. It is understood that the non-volatile write cache 102 stores these page data only in the case that the page data are associated with the same logical address and are indicated as clean. In the case that page data in the non-volatile write cache 102 would be associated with the same logical address but indicated as dirty, these page data would be an update over the page data stored in the non-volatile NAND flash storage 104 and, thus, would usually not be the same.

According to various aspects, the memory controller 108 may be configured to indicate each write cache page that stores page data corresponding to one of those page data as dirty (without reading the page data from the non-volatile NAND flash storage 104 to the non-volatile write cache 102) and to indicated the pages of the non-volatile NAND flash storage 104 that store these page data as invalid.

In the example of FIG. 4C, the non-volatile write cache 102 may store the ninth page data associated with the fifth logical address "H", the tenth page data associated with the sixth logical address "I", and the eleventh page data associated with the seventh logical address "J", but not the twelfth page data associated with the eighth logical address "Z".

The memory controller 108 may be configured to store (e.g., read) the twelfth page data to the non-volatile write cache 102 and to indicate the twelfth page data storing the twelfth page data in the non-volatile NAND flash storage 104 as invalid.

Optionally, the memory controller 108 may be configured to write the twelfth page data associated with the eighth logical address "Z" to the active write block 406 of the non-volatile NAND flash storage 104 and to update the page metadate (e.g., the physical address associated with the eighth logical address "Z" in the L2P table), as shown in configuration 428 in FIG. 4C.

Further, indicating the ninth page data associated with the fifth logical address "H", the tenth page data associated with the sixth logical address "I", and the eleventh page data associated with the seventh logical address "J", as dirty in the non-volatile write cache 102 without writing them to the non-volatile NAND flash storage 104 does not require an update to the physical address but only the dirty/clean indicator (to indicate the pages as dirty) of the page metadata 416.

According to various aspects, the memory controller 108 may be configured to erase the block 420 while at least one of the ninth page data, the tenth page data, the eleventh page data, and/or the twelfth page data is indicated as dirty in the non-volatile write cache 102. Hence, the block 420 may be erased prior to writing at least some of the page data (e.g., the ninth page data, the tenth page data, the eleventh page data, and/or the twelfth page data) to the non-volatile NAND flash storage 104. This illustratively speeds up the garbage collection process.

Thus, the non-volatile write cache 102 allows a garbage collection process which does not require any write operation of writing page data to the non-volatile NAND flash storage 104, but only to indicate page data already present in the non-volatile write cache 102 as dirty and/or to read page data not yet present in the non-volatile write cache 102 to the non-volatile write cache 102. This allows for a parallel garbage collection of multiple blocks, thereby further speeding up the garbage collection process due to (temporally) shorter and optionally partially overlapping block erase cycles.

Figure 5:
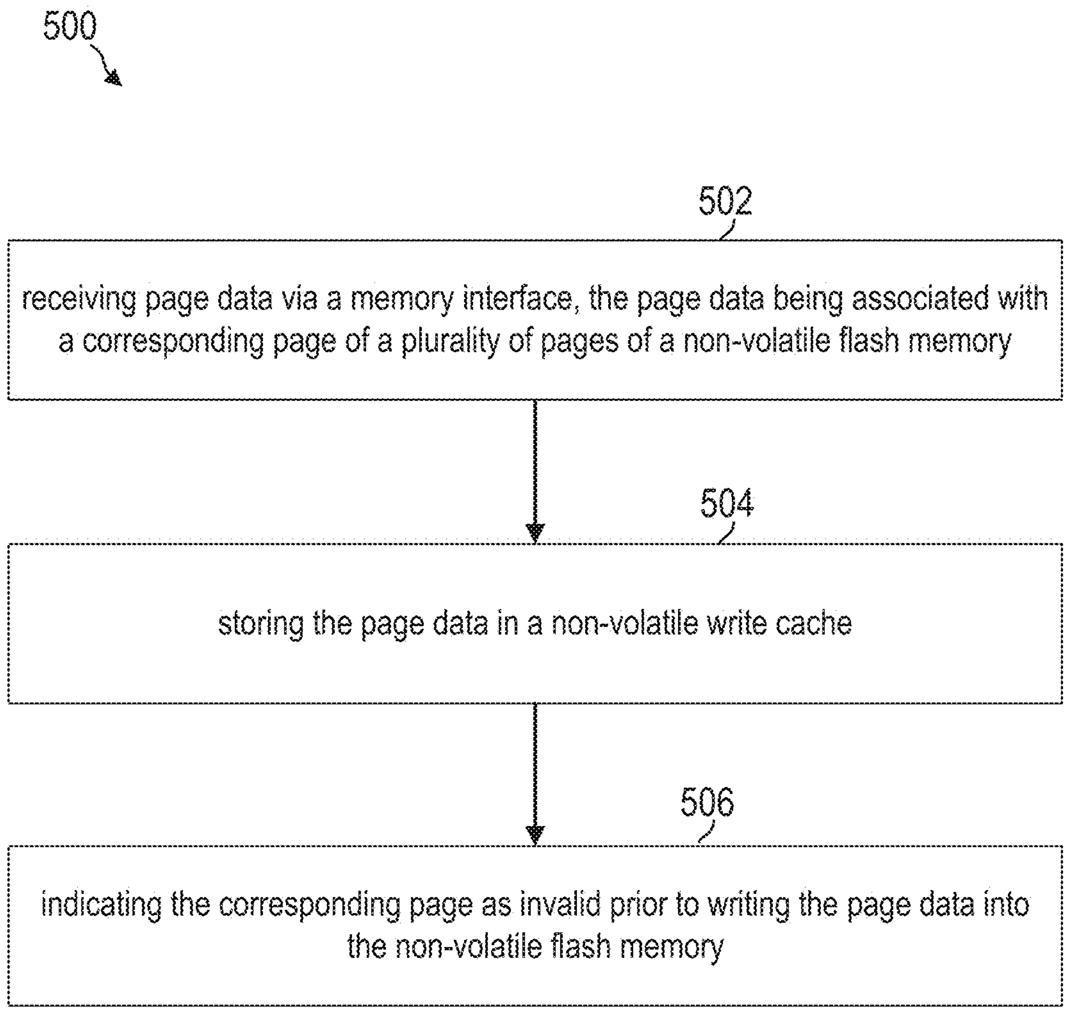
FIG. 5 shows a flow diagram of a method for operating a memory module according to various aspects.

FIG. 5 shows a flow diagram of a method 500 of operating a memory module (e.g., of writing page data to the memory module) according to various aspects. The memory module may be configured in accordance with the memory module 100. The memory module may include a non-volatile write cache (e.g., may include a non-volatile memory (device) providing the write cache) and a non-volatile (e.g., NAND) flash storage. The non-volatile (NAND) flash storage may include a plurality of blocks. Each block of the plurality of blocks may include a (respective) plurality of pages for storing page data.

The method 500 may include (in 502) receiving page data via a memory interface, the page data being associated with a corresponding page of the plurality of pages of a block of the plurality of blocks (of the non-volatile (NAND) flash storage).

The method 500 may include (in 504) storing the page data in the non-volatile write cache.

The method 500 may include (in 506) indicating the corresponding page as invalid prior to writing the page data into the non-volatile (NAND) flash storage.

Hence, in general, a method of operating such a memory module may include: receiving page data associated with a page of a non-volatile NAND flash storage, storing the page data in the non-volatile write cache, and indicating the page as invalid prior to writing the page data into the non-volatile NAND flash storage.

Figure 6:
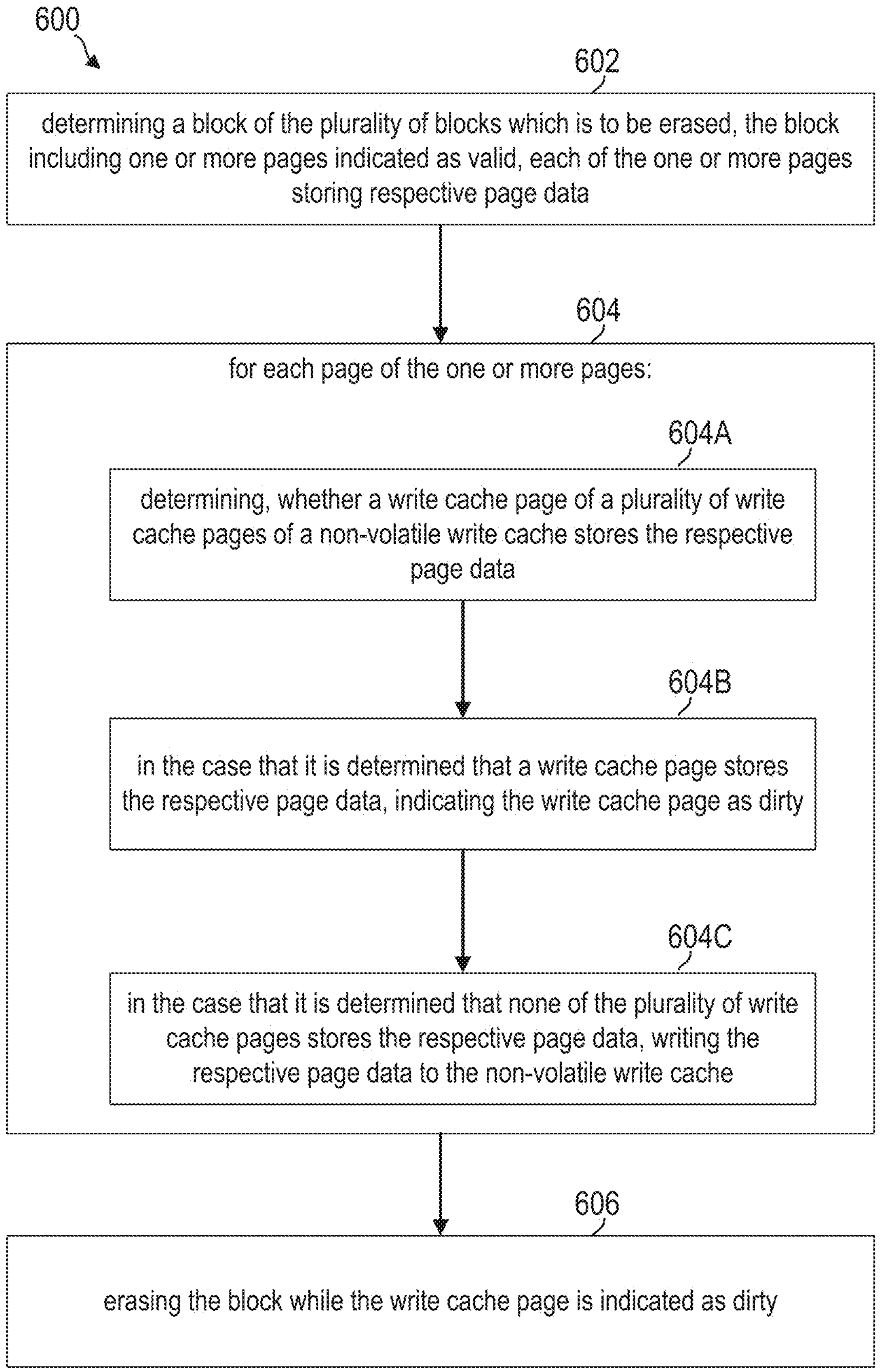
FIG. 6 shows a flow diagram of a method of erasing a block of the NAND flash storage according to various aspects.

FIG. 6 shows a flow diagram of a method 600 of erasing a block of a (e.g., NAND) flash storage according to various aspects.

The method 600 may include (in 602) determining the block of the plurality of blocks which is to be erased (for garbage collection), the block including one or more pages indicated as valid, each of the one or more pages storing respective page data.

The method 600 may include (in 604) for each page of the one or more pages: determining (in 604A), whether a write cache page of a plurality of write cache pages of a non-volatile write cache (e.g., provided by a non-volatile memory) stores the respective page data (stored in the page), and in the case that it is determined that a write cache page stores the respective page data, indicating (in 604B) the write cache page as dirty.

The method 600 may include for each page of the one or more pages (in 604C) in the case that it is determined that none of the plurality of write cache pages stores the respective page data, writing the respective page data to the non-volatile write cache.

The method 600 may include (in 606) erasing the block while the write cache page is indicated as dirty.

Hence, in general, a method of erasing a block of a (e.g., NAND) flash storage may include: for each page, which is indicated as valid, of a block that is to be erased (for garbage collection), in the case that respective page data of the page are stored in a write cache page of the non-volatile write cache, indicating the page as invalid (without reading the respective page data to the write cache and prior to writing the respective page data to the non-volatile (NAND) flash storage); and erasing the block while the write cache page is indicated as dirty.

It may be intended that aspects described in relation to one or more of the methods may apply also to the memory module, and vice versa. For example, a method may include an execution of one or more functions described with reference to the memory module. For example, the memory controller 108 of the memory module 100 may be configured to carry out one or more aspects described herein.

In the following, various examples are provided that may include one or more aspects described above with reference to the memory module 100, the memory controller 108, and to the methods described herein. It may be intended that aspects described in relation to one or more of the methods may apply also to the memory cell and/or the memory cell arrangement, and vice versa.

Example 1 is a (computer-readable) memory module including: a non-volatile (viz. persistent) write cache (e.g., including a non-volatile memory (device) providing the write cache); a non-volatile (NAND) flash storage (device) including a plurality of blocks, wherein each of the plurality of blocks includes a plurality of pages for storing page data; and a memory controller configured to: receive page data via a memory interface and store the page data in the non-volatile write cache, the page data being associated with a corresponding page of the plurality of pages of a block of the plurality of blocks (of the non-volatile (NAND) flash storage), and indicate the corresponding page as invalid prior to writing the page data into (an empty region (e.g., erased page) of) the non-volatile (NAND) flash storage.

Thus, (since there is no risk of losing the (e.g., modified) page data stored in the non-volatile write cache) the corresponding page can be indicated as invalid at an earlier point in time (viz. prior to the NAND write operation).

In Example 2, the subject matter of Example 1 can optionally include that the non-volatile write cache includes a plurality of write cache pages for storing page data; wherein the memory controller is further configured to: determine a block of the plurality of blocks which is to be erased (for garbage collection), the block including one or more pages indicated as valid, each of the one or more pages storing respective page data; for each page of the one or more pages: determine, whether a (clean) write cache page of the plurality of write cache pages stores the respective page data (stored in the page), in the case that it is determined that a write cache page stores the respective page data, indicate the write cache page as dirty, in the case that it is determined that none of the plurality of write cache pages stores the respective page data, store the respective page data in (e.g., write the respective page data to (e.g., a write cache page of)) the non-volatile write cache; and erase the (determined) block (prior to writing the respective page data of each page, for which it is determined that a write cache page stores them, into the non-volatile (NAND) flash storage and/or prior to writing the respective page data, that are written to the non-volatile write cache, to the (NAND) flash storage).

Since it is not necessary to write the page data, which are also stored in the non-volatile write cache, into the non-volatile (NAND) flash storage prior to erasing the block, the erasure of blocks (and hence garbage collection) can be sped up. This improved garbage collection leads to a significant reduction of write amplification, thereby speeding up the storage of page data and reducing the amount of necessary write-erase cycles (thereby increasing the lifetime of the memory module). Illustratively, conflicts between garbage collection writes and user writes are reduced (e.g., minimized).

In Example 3, the subject matter of Example 2 can optionally include that the memory controller is configured to determine the block which is to be erased by selecting the block of the plurality of blocks which has the lowest number of pages that are indicated as valid.

In Example 4, the subject matter of Example 2 or 3 can optionally include that each page of the plurality of pages is associated with respective page metadata for page allocation; wherein the memory controller is configured to, for each page of the one or more pages: in the case that it is determined that a write cache page stores the respective page data, indicate the write cache page as dirty and to not change the respective page metadata of the page.

In Example 5, the subject matter of anyone of Examples 2 to 4 can optionally include that the memory controller is configured to: concurrently write the respective page data, that are written to the non-volatile write cache (viz. for which it is determined that none of the plurality of write cache pages stores them), to the non-volatile (NAND) flash storage and erase the (determined) block.

In Example 6, the subject matter of anyone of Examples 2 to 4 can optionally include that the memory controller is configured to: erase the (determined) block prior to writing the respective page data, that are written to the non-volatile write cache (viz. for which it is determined that none of the plurality of write cache pages stores them), to the non-volatile (NAND) flash storage.

In Example 7, the subject matter of any one of Examples 1 to 6 can optionally include that the memory controller is configured to write the (received) page data into the non-volatile (NAND) flash storage (opportunistically).

In Example 8, the subject matter of anyone of Examples 1 to 7 can optionally include that the memory controller is further configured to: (always) send an acknowledgement message to acknowledge reception of the (received) page data via the memory interface (and, thus, writing of the (received) page data) (to a sender of the page data) prior to writing the (received) page data into the non-volatile (NAND) flash storage.

Conventional memory modules having a volatile (viz. non-persistent) write cache may be operated in a write cache enabled mode, in which an acknowledgement message is send upon storing received page data in the write cache, or in a write cache disabled mode, in which the acknowledgement message is send upon storing received page data in the non-volatile (NAND) flash storage. In the write cache enabled mode, after sending the acknowledgement message, in the event of a system failure, such as a sudden loss of power, the page data stored in the volatile write cache may be lost. Thus, there has to be a decision whether an increase of performance provided by the write cache enabled mode justifies the risk of data loss. Using the non-volatile write cache as detailed herein prohibits this risk of losing page data, thereby providing the performance increase of the write cache enabled mode at any time. Illustratively, the memory module may provide a data safety of the write cache disabled mode (with sending the acknowledgement message once the page data are stored non-volatile) while having the performance of the write cache enabled mode.

In Example 9, the subject matter of any one of Examples 1 to 8 can optionally include that the memory interface is a SATA interface or a Non-Volatile Memory Express (NVMe) interface.

Example 10 is a (computer-readable) memory module including: a non-volatile (viz. persistent) write cache including a plurality of write cache pages for storing page data; a non-volatile (NAND) flash storage (device) including a plurality of blocks, wherein each of the plurality of blocks includes a plurality of pages for storing page data; and a memory controller configured to carry out an erase operation, the erase operation including: determine a block of the plurality of blocks which is to be erased (for garbage collection), the block including one or more pages indicated as valid, each of the one or more pages storing respective page data; for each page of the one or more pages: determine, whether a write cache page of the plurality of write cache pages stores the respective page data (stored in the page), and in the case that it is determined that a write cache page stores the respective page data, indicate the write cache page as dirty; and erase the (determined) block while the write cache page is indicated as dirty (prior to writing the respective page data of each page, for which it is determined that a write cache page stores them, into the non-volatile (NAND) flash storage).

In Example 11, the subject matter of Example 10 can optionally include that the memory controller is configured to: for each page of the one or more pages: in the case that it is determined that none of the plurality of write cache pages stores the respective page data, store the respective page data in (e.g., write the respective page data to (e.g., a write cache page of)) the non-volatile write cache (the block may be erased prior to writing the respective page data, that are written to the non-volatile write cache, to the (NAND) flash storage).

In Example 12, the subject matter of Example 10 or 11 can optionally include that the memory controller is configured to determine the block which is to be erased by selecting the block of the plurality of blocks which has the lowest number of pages that are indicated as valid.

In Example 13, the subject matter of any one of Examples 10 to 12 can optionally include that each page of the plurality of pages is associated with respective page metadata for page allocation; wherein the memory controller is configured to, for each page of the one or more pages: in the case that it is determined that a write cache page stores the respective page data, indicate the write cache page as dirty and to not change the respective page metadata of the page.

In Example 14, the subject matter of any one of Examples 10 to 13 can optionally include that the memory controller is configured to: concurrently write the respective page data, that are written to the non-volatile write cache (viz. for which it is determined that none of the plurality of write cache pages stores them), to the non-volatile (NAND) flash storage and erase the (determined) block.

Example 15 is a memory module according to any one of Examples 10 to 13, provided that in combination with Example 11, wherein the memory controller is configured to: erase the (determined) block prior to writing the respective page data, that are written to the non-volatile write cache (viz. for which it is determined that none of the plurality of write cache pages stores them), to the non-volatile (NAND) flash storage.

In Example 16, the memory module of any one of Examples 1 to 15 can optionally further include: a non-volatile memory providing the non-volatile write cache. The non-volatile memory may be, for example, a remanent-polarizable memory, such as ferroelectric non-volatile random-access memory, FeNVRAM, or may be a magnetoresistive random-access memory (MRAM) or a resistive random-access memory (RRAM).

In Example 17, the subject matter of any one of Examples 1 to 16 can optionally include that the memory module is a solid-state disc (SSD).

Example 18 is a method for operating a memory module that includes a non-volatile (viz. persistent) write cache (e.g., includes a non-volatile memory (device) providing the write cache) and a non-volatile (NAND) flash storage (device), the non-volatile (NAND) flash storage including a plurality of blocks, wherein each of the plurality of blocks includes a plurality of pages for storing page data, the method including: receiving page data via a memory interface, the page data being associated with a corresponding page of the plurality of pages of a block of the plurality of blocks (of the non-volatile (NAND) flash storage) (e.g., representing a (expected) modification of (e.g., an update to) page data stored in a corresponding page of a plurality of pages associated with a block of the plurality of blocks of the non-volatile (NAND) flash storage); storing the page data in the non-volatile write cache; and indicating the corresponding page as invalid prior to writing the page data into (an empty region (e.g., erased page) of) the non-volatile (NAND) flash storage.

In Example 19, the subject matter of Example 18 can optionally include that the non-volatile write cache includes a plurality of write cache pages for storing page data; wherein the method further includes: determining a block of the plurality of blocks which is to be erased (for garbage collection), the block including one or more pages indicated as valid, each of the one or more pages storing respective page data; for each page of the one or more pages: determining, whether a (clean) write cache page of the plurality of write cache pages stores the respective page data (stored in the page), in the case that it is determined that a write cache page stores the respective page data, indicating the write cache page as dirty, in the case that it is determined that none of the plurality of write cache pages stores the respective page data, storing the respective page data in (e.g., writing the respective page data to (e.g., a write cache page of)) the non-volatile write cache; and erasing the (determined) block (prior to writing the respective page data of each page, for which it is determined that a write cache page stores them, into the non-volatile (NAND) flash storage and/or prior to writing the respective page data, that are written to the non-volatile write cache, to the (NAND) flash storage).

In Example 20, the subject matter of Example 19 can optionally include that the block which is to be erased is determined by selecting the block of the plurality of blocks which has the lowest number of pages that are indicated as valid.

In Example 21, the subject matter of Example 19 or 20 can optionally include that each page of the plurality of pages is associated with respective page metadata for page allocation; wherein, in the case that it is determined that a write cache page stores the respective page data, the respective page metadata of the page are not changed.

In Example 22, the method of any one of Examples 19 to 21 can optionally further include: concurrently writing the respective page data, that are written to the non-volatile write cache (viz. for which it is determined that none of the plurality of write cache pages stores them), to the non-volatile (NAND) flash storage and erasing the (determined) block.

In Example 23, the subject matter of any one of Examples 19 to 21 can optionally further include: erasing the (determined) block prior to writing the respective page data, that are written to the non-volatile write cache (viz. for which it is determined that none of the plurality of write cache pages stores them), to the non-volatile (NAND) flash storage.

In Example 24, the method of any one of Examples 18 to 23 can optionally further include: writing the (received) page data into the non-volatile (NAND) flash storage (opportunistically).

In Example 25, the method of any one of Examples 18 to 24 can optionally further include: (always) sending an acknowledgement message to acknowledge reception of the (received) page data via the memory interface (and, thus, writing of the (received) page data) (to a sender of the page data) prior to writing the (received) page data into the non-volatile (NAND) flash storage.

In Example 26, the subject matter of any one of Examples 18 to 25 can optionally include that the memory interface is a SATA interface or a Non-Volatile Memory Express (NVMe) interface.

Example 27 is a method for erasing a block of a plurality of blocks of a non-volatile (NAND) flash storage, each of the plurality of blocks including a plurality of pages for storing page data, the method including: determining the block of the plurality of blocks which is to be erased (for garbage collection), the block including one or more pages indicated as valid, each of the one or more pages storing respective page data; for each page of the one or more pages: determining, whether a write cache page of a plurality of write cache pages of a non-volatile write cache stores the respective page data (stored in the page), and in the case that it is determined that a write cache page stores the respective page data, indicating the write cache page as dirty; and erasing the block while the write cache page is indicated as dirty (prior to writing the respective page data of each page, for which it is determined that a write cache page stores them, into the non-volatile (NAND) flash storage.

In Example 28, the method according to Example 27, may further include: for each page of the one or more pages, in the case that it is determined that none of the plurality of write cache pages stores the respective page data, storing the respective page data in (e.g., write the respective page data to (e.g., a write cache page of)) the non-volatile write cache (the block may be erased prior to writing the respective page data, that are written to the non-volatile write cache, to the (NAND) flash storage).

In Example 29, the subject matter of Example 27 or 28 can optionally include that the block which is to be erased is determined by selecting the block of the plurality of blocks which has the lowest number of pages that are indicated as valid.

In Example 30, the subject matter of any one of Examples 27 to 29 can optionally include that each page of the plurality of pages is associated with respective page metadata for page allocation; wherein, in the case that it is determined that a write cache page stores the respective page data, the respective page metadata of the page are not changed.

In Example 31, the method of any one of Examples 27 to 30 can optionally further include: concurrently writing the respective page data, that are written to the non-volatile write cache (viz. for which it is determined that none of the plurality of write cache pages stores them), to the non-volatile (NAND) flash storage and erasing the (determined) block.

In Example 32, the method according to any one of Examples 27 to 31, provided that in combination with Example 28, can optionally further include: erasing the (determined) block prior to writing the respective page data, that are written to the non-volatile write cache (viz. for which it is determined that none of the plurality of write cache pages stores them), to the non-volatile (NAND) flash storage.

In Example 33, the subject matter of any one of Examples 18 to 32 can optionally include that a ferroelectric non-volatile random-access memory and/or an anti-ferroelectric random-access memory provides the non-volatile write cache.

In Example 34, the subject matter of any one of Examples 18 to 33 can optionally include that the memory module is a solid-state disc (SSD).

Example 35 is a (computer-readable) memory module including: a non-volatile (viz. persistent) write cache; a non-volatile (NAND) flash storage; and a memory controller configured to: receive page data associated with a page of the non-volatile (NAND) flash storage, store the page data in the non-volatile write cache, and indicate the page as invalid prior to writing the page data into (an erased page of) the non-volatile (NAND) flash storage.

In Example 36, the subject matter of Example 35 can optionally include that the memory controller is further configured to: for each page, which is indicated as valid, of a block that is to be erased (for garbage collection): in the case that page data of the page are stored in the non-volatile write cache, indicate the page as invalid, in the case that the page data of the page are not stored in the non-volatile write cache, write the page data to the non-volatile write cache; and erase the block (prior to writing the page data that are not stored in the non-volatile write cache into the non-volatile (NAND) flash storage and/or prior to writing the page data that are stored in the non-volatile write cache into the non-volatile (NAND) flash storage).

In Example 37, the subject matter of Example 35 or 36 can optionally include that the memory module is, where applicable, configured in accordance with any one of Examples 1 to 9.

Example 38 is a (computer-readable) memory module including: a non-volatile (viz. persistent) write cache; a non-volatile (NAND) flash storage; and a memory controller configured to: for each page, which is indicated as valid, of a block that is to be erased (for garbage collection), in the case that respective page data of the page are stored in a write cache page of the non-volatile write cache, indicate the page as invalid and indicate the write cache page as dirty (without reading the respective page data to the write cache and prior to writing the respective page data to the non-volatile (NAND) flash storage); and erase the block while the write cache page is indicated as dirty (prior to writing the respective page data of each page stored in the non-volatile write cache into the non-volatile (NAND) flash storage).

In Example 39, the subject matter of Example 38 can optionally include that the memory controller is further configured to: for each page, which is indicated as valid, of the block that is to be erased (for garbage collection), in the case that the respective page data are not stored in the non-volatile write cache, store the respective page data in (e.g., write the respective page data to) the non-volatile write cache.

In Example 40, the subject matter of Example 38 or 39 can optionally include that the memory module is, where applicable, configured in accordance with any one of Examples 10 to 17.

Example 41 is a method for operating a memory module that includes a non-volatile (viz. persistent) write cache and a non-volatile (NAND) flash storage, the method including: receiving page data associated with a page of the non-volatile (NAND) flash storage; storing the page data in the non-volatile write cache; and indicating the page as invalid prior to writing the page data into (an erased page of) the non-volatile (NAND) flash storage.

In Example 42, the subject matter of Example 41 can optionally include that the method includes, where applicable, one or more aspects in accordance with any one of Examples 18 to 26.

Example 43 is a method for erasing a block of a non-volatile (NAND) flash storage, the method including: for each page, which is indicated as valid, of a block that is to be erased (for garbage collection), in the case that respective page data of the page are stored in a write cache page of the non-volatile write cache, indicating the page as invalid and indicate the write cache page as dirty (without reading the respective page data to the write cache and prior to writing the respective page data to the non-volatile (NAND) flash storage); and erasing the block while the write cache page is indicated as dirty (prior to writing the respective page data of each page stored in the non-volatile write cache into the non-volatile (NAND) flash storage).

In Example 44, the memory module of Example 43 can optionally further include: for each page, which is indicated as valid, of the block that is to be erased (for garbage collection), in the case that the respective page data are not stored in the non-volatile write cache, storing the respective page data in (e.g., write the respective page data to) the non-volatile write cache.

In Example 45, the subject matter of Example 43 or 44 can optionally include that the method includes, where applicable, one or more aspects accordance with any one of Examples 27 to 34.

The term “connected” may be used herein with respect to nodes, terminals, integrated circuit elements, and the like, to mean electrically connected, which may include a direct connection or an indirect connection, wherein an indirect connection may only include additional structures in the current path that do not influence the substantial functioning of the described circuit or device. The term “electrically conductively connected” that is used herein to describe an electrical connection between one or more terminals, nodes, regions, contacts, etc., may be understood as an electrically conductive connection with, for example, ohmic behavior, e.g., provided by a metal or degenerate semiconductor in absence of p-n junctions in the current path. The term “electrically conductively connected” may be also referred to as “galvanically connected”.

The term “coupled to” used herein with reference to components of a memory module may be understood in that the components are directly or indirectly communicatively coupled to one another.

The terms “at least one” and “one or more” may be understood to include any integer number greater than or equal to one, i.e. one, two, three, four, [ . . . ], etc. The term “a plurality” or “a multiplicity” may be understood to include any integer number greater than or equal to two, i.e. two, three, four, five, [ . . . ], etc. The phrase “at least one of” with regard to a group of elements may be used herein to mean at least one element from the group consisting of the elements. For example, the phrase “at least one of” with regard to a group of elements may be used herein to mean a selection of: one of the listed elements, a plurality of one of the listed elements, a plurality of individual listed elements, or a plurality of a multiple of listed elements.

The phrase that an element or a group of elements “includes” another element or another group of elements may be used herein to mean that the other element or other group of elements may be part of the element or the group of elements or that the element or the group of elements may be configured or formed as the other element or the other group of elements (e.g., the element may be the other element).

The phrase “unambiguously assigned” may be used herein to mean a one-to-one-assignment (e.g., allocation, e.g., correspondence) or a bijective assignment. As an example, a first element being unambiguously assigned to a second element may include that the second element is unambiguously assigned to the first element. As another example, a first group of elements being unambiguously assigned to a second group of element may include that each element of the first group of elements is unambiguously assigned to a corresponding element of the second group of elements and that that corresponding element of the second group of elements is unambiguously assigned to the element of the first group of elements.

It is noted that one or more functions described herein with reference to a memory module may be accordingly part of a method, e.g., part of a method for operating a memory module. Vice versa, one or more functions described herein with reference to a method, e.g., with reference to a method for operating a memory module, may be implemented accordingly in a device or in a part of a device, for example, by a memory controller.

A memory may either be volatile or non-volatile. Both, a volatile memory and a non-volatile memory may be configured to store data thereon. A volatile memory may require constant power in order to store data. Thus, once the power is lost, the stored data are gone. Hence, a volatile memory may store data non-persistently. A non-volatile memory, on the other hand, may also store the data once the power is removed. Hence, a non-volatile memory may store data persistently.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes, which come within the meaning and range of equivalency of the claims, are therefore intended to be embraced.

What is claimed is:

1. A memory module comprising:

a non-volatile write cache comprising a plurality of write cache pages for storing page data;

a non-volatile flash storage comprising a plurality of blocks, wherein each of the plurality of blocks comprises a plurality of pages for storing page data; and a memory controller configured to:

determine a block of the plurality of blocks which is to be erased, the block comprising one or more pages indicated as valid, each of the one or more pages storing respective page data, for each page of the one or more pages: determine, whether a write cache page of the plurality of write cache pages stores the respective page data, and in the case that it is determined that a write cache page stores the respective page data, indicate the write cache page as dirty, and erase the block when the write cache page is indicated as dirty.

2. The memory module according to claim 1, wherein the memory controller is further configured to:

for each page of the one or more pages, when it is determined that none of the plurality of write cache pages stores the respective page data, store the respective page data in the non-volatile write cache.

3. The memory module according to claim 2, wherein the memory controller is further configured to:

concurrently write the respective page data, which are written to the non-volatile write cache, to the non-volatile flash storage and erase the block; or erase the block prior to writing the respective page data, which are written to the non-volatile write cache, to the non-volatile flash storage.

4. The memory module according to claim 2, wherein each page of the plurality of pages is associated with respective page metadata for page allocation; and when it is determined that a write cache page stores the respective page data, the memory controller is further configured to, for each page of the one or more pages, indicate the write cache page as dirty and to not change the respective page metadata of the page.

5. The memory module according to claim 1, further comprising:

a non-volatile memory providing the non-volatile write cache.

6. The memory module according to claim 1, wherein the memory module is a solid-state disc.

7. The memory module according to claim 1, wherein the memory controller is further configured to:

receive page data via a memory interface and store the page data in the non-volatile write cache, the page data being associated with a corresponding page of the plurality of pages of a block of the plurality of blocks, and indicate the corresponding page as invalid prior to writing the page data into the non-volatile flash storage.

8. The memory module according to claim 7, wherein the memory controller is further configured to send an acknowledgement message to acknowledge reception of the page data via the memory interface prior to writing the page data into the non-volatile flash storage.

9. The memory module according to claim 7, wherein the memory interface is a serial AT-attachment (SATA) interface or a Non-Volatile Memory Express interface.

10. The memory module according to claim 1, wherein the memory controller is further configured to write the page data into the non-volatile flash storage.

11. A method for operating a memory module that comprises a remanent-polarizable memory comprising a non-volatile write cache and a non-volatile flash storage, wherein the non-volatile write cache comprises a plurality of write cache pages for storing page data, wherein the non-volatile flash storage comprises a plurality of blocks, wherein each of the plurality of blocks comprises a plurality of pages for storing page data, the method comprising:

receiving page data via a memory interface, the page data being associated with a corresponding page of the plurality of pages of a block of the plurality of blocks;

storing the page data in the non-volatile write cache within the remanent-polarizable memory;

indicating the corresponding page as invalid prior to writing the page data into the non-volatile flash storage; and determining a block of the plurality of blocks which is to be erased, the block comprising one or more pages indicated as valid, each of the one or more pages storing respective page data;

for each page of the one or more pages:

determining, whether a write cache page of the plurality of write cache pages stores the respective page data, in the case that it is determined that a write cache page stores the respective page data, indicating the write cache page as dirty, in the case that it is determined that none of the plurality of write cache pages stores the respective page data, storing the respective page data in the non-volatile write cache; and erasing the block when the write cache page is indicated as dirty.

12. The method according to claim 11, further comprising:

concurrently writing the respective page data, which are written to the non-volatile write cache, to the non-volatile flash storage and erasing the block; or erasing the block prior to writing the respective page data, which are written to the non-volatile write cache, to the non-volatile flash storage.

13. The method according to claim 11, further comprising:

writing the page data into the non-volatile flash storage.

14. The method according to claim 11, further comprising:

sending an acknowledgement message to acknowledge reception of the page data via the memory interface prior to writing the page data into the non-volatile flash storage.

15. The method according to claim 11, wherein the memory interface is a serial AT-attachment (SATA) interface or a Non-Volatile Memory Express interface.

* * * * *